(12) United States Patent
Li et al.

(10) Patent No.: US 9,632,768 B2
(45) Date of Patent: *Apr. 25, 2017

(54) EXCHANGING PROJECT-RELATED DATA IN A CLIENT-SERVER ARCHITECTURE

(71) Applicant: Oracle America, Inc., Redwood Shores, CA (US)

(72) Inventors: Jimin Li, Belmont, CA (US); Cory D. Wiegert, San Francisco, CA (US); Kwong Ming Tse, Foster City, CA (US); Xuan Wei, San Francisco, CA (US); James Gan Fong, Sammamish, WA (US); Matthew Philip Grumbach, San Mateo, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1018 days.

This patent is subject to a terminal disclaimer.

(21) Appl. No.: 13/892,580

(22) Filed: May 13, 2013

(65) Prior Publication Data

US 2013/0326468 A1    Dec. 5, 2013

Related U.S. Application Data

(63) Continuation of application No. 10/405,051, filed on Mar. 31, 2003, now Pat. No. 8,443,036.

(Continued)

(51) Int. Cl.
  *G06F 9/44* (2006.01)
  *G06Q 10/10* (2012.01)
  *G06F 17/30* (2006.01)

(52) U.S. Cl.
  CPC ............ *G06F 8/70* (2013.01); *G06F 17/3056* (2013.01); *G06Q 10/10* (2013.01)

(58) Field of Classification Search
  CPC ............. G06Q 10/10; G06F 17/30569; G06F 17/30581; G06F 8/70
  See application file for complete search history.

(56) References Cited

U.S. PATENT DOCUMENTS 4,974,191 A    11/1990 Amirghodsi et al.
5,386,559 A    1/1995 Eisenberg et al.
(Continued)

OTHER PUBLICATIONS

Aiken, Peter, Microsoft Computer Dictionary 2002, Microsoft Press, Fifth Edition.
(Continued)

*Primary Examiner* — Backhean Tiv
(74) *Attorney, Agent, or Firm* — Sheppard Mullin Richter & Hampton LLP

(57) ABSTRACT

Techniques are described for exchanging data between software applications, such as project-related data between a project management software application ("PMSA") and an unaffiliated organizational project tracking software application ("OPTSA"). A computing architecture with multiple interacting computer systems, such as a client-server architecture, can be used to allow users of remote computing systems to access project-related data and/or functionality from other computing systems, such as a thin client computing system with limited or no local capabilities to execute software applications and/or store associated application data accessing a remote central server computing system in order to interact with a PMSA executing on the server, to interact with an OPTSA executing on the server, and/or to invoke data exchange functionality available at the server for exchanging project-related data between the PMSA and OPTSA.

19 Claims, 12 Drawing Sheets

Related U.S. Application Data

(60) Provisional application No. 60/427,636, filed on Nov. 18, 2002.

(56) References Cited

U.S. PATENT DOCUMENTS

| | | | |
|---|---|---|---|
| 5,434,994 A * | 7/1995 | Shaheen | G06F 12/0815 707/999.202 |
| 5,493,692 A | 2/1996 | Theimer et al. | |
| 5,548,506 A * | 8/1996 | Srinivasan | G06Q 10/063114 700/95 |
| 5,564,044 A * | 10/1996 | Pratt | G06F 9/543 707/999.008 |
| 5,684,990 A * | 11/1997 | Boothby | G06F 17/30581 |
| 5,819,020 A * | 10/1998 | Beeler, Jr. | G06F 11/2071 707/999.202 |
| 5,862,325 A | 1/1999 | Reed et al. | |
| 6,141,663 A | 10/2000 | Hunkins et al. | |
| 6,167,433 A | 12/2000 | Maples et al. | |
| 6,182,221 B1 | 1/2001 | Hsu et al. | |
| 6,192,408 B1 * | 2/2001 | Vahalia | G06F 17/30171 707/E17.007 |
| 6,237,027 B1 | 5/2001 | Namekawa | |
| 6,263,362 B1 | 7/2001 | Donoho et al. | |
| 6,308,164 B1 * | 10/2001 | Nummelin | G06Q 10/04 705/7.23 |
| 6,324,262 B1 | 11/2001 | Tuttle | |
| 6,341,291 B1 * | 1/2002 | Bentley | G06F 17/30126 |
| 6,356,936 B1 | 3/2002 | Donoho et al. | |
| 6,369,705 B1 | 4/2002 | Kennedy | |
| 6,442,241 B1 | 8/2002 | Tsumpes | |
| 6,453,348 B1 * | 9/2002 | Barnier | H04L 29/06 709/200 |
| 6,462,665 B1 | 10/2002 | Tarlton et al. | |
| 6,529,941 B2 * | 3/2003 | Haley | H04L 12/1822 709/204 |
| 6,601,076 B1 | 7/2003 | McCaw et al. | |
| 6,606,744 B1 | 8/2003 | Mikurak | |
| 6,633,240 B1 | 10/2003 | Sweatt | |
| 6,654,786 B1 | 11/2003 | Fox et al. | |
| 6,697,861 B2 * | 2/2004 | Barnier | H04L 29/06 709/200 |
| 6,724,861 B2 | 4/2004 | Newland et al. | |
| 6,745,021 B1 | 6/2004 | Stevens | |
| 6,757,689 B2 | 6/2004 | Battas et al. | |
| 6,829,478 B1 | 12/2004 | Layton et al. | |
| 6,901,437 B1 | 5/2005 | Li | |
| 7,100,195 B1 * | 8/2006 | Underwood | G06F 9/4443 707/999.009 |
| 7,127,501 B1 * | 10/2006 | Beir | G06F 17/3089 707/E17.116 |
| 7,177,909 B2 | 2/2007 | Stark et al. | |
| 7,246,150 B1 | 7/2007 | Donoho et al. | |
| 7,343,302 B2 | 3/2008 | Aratow et al. | |
| 7,616,942 B2 | 11/2009 | Karl et al. | |
| 7,836,103 B2 * | 11/2010 | Li | G06F 17/30569 707/705 |
| 8,443,036 B2 * | 5/2013 | Li | G06Q 10/10 707/802 |
| 2002/0129081 A1 | 9/2002 | Rai et al. | |
| 2002/0165724 A1 | 11/2002 | Blankesteijn | |
| 2002/0188522 A1 | 12/2002 | McCall et al. | |
| 2003/0009385 A1 | 1/2003 | Tucciarone et al. | |
| 2003/0018717 A1 * | 1/2003 | Haley | H04L 12/1822 709/205 |
| 2003/0055689 A1 | 3/2003 | Block et al. | |
| 2003/0066030 A1 * | 4/2003 | Curns | G06Q 10/06 715/234 |
| 2003/0141971 A1 | 7/2003 | Heiken | |
| 2003/0144970 A1 | 7/2003 | Coyne | |
| 2003/0179089 A1 | 9/2003 | Sweatt | |
| 2003/0193394 A1 | 10/2003 | Lamb | |
| 2003/0204458 A1 | 10/2003 | Carroll et al. | |
| 2003/0222777 A1 | 12/2003 | Sweatt | |
| 2004/0008125 A1 | 1/2004 | Aratow et al. | |
| 2004/0030591 A1 | 2/2004 | Graham | |
| 2004/0030992 A1 | 2/2004 | Moisa et al. | |
| 2004/0083238 A1 * | 4/2004 | Louis | G06Q 10/06 |
| 2004/0098672 A1 * | 5/2004 | Belcher | G06F 17/30569 715/249 |
| 2005/0021494 A1 * | 1/2005 | Wilkinson | H04M 1/7253 |
| 2005/0198087 A1 | 9/2005 | Bremers | |
| 2006/0265462 A1 | 11/2006 | Stark et al. | |
| 2007/0192422 A1 | 8/2007 | Stark et al. | |
| 2007/0207771 A1 | 9/2007 | Bowser et al. | |

OTHER PUBLICATIONS

IBM, OpenAir.com 'Turbocharges' Software for Expanded ASP Delivery, Aug. 2001; 1 page.

Microsoft Project 2002 Product Guide, Microsoft Corporation, p. 1 (Jun. 6, 2002), "http://www.microsoft.com/office/project/evaluation/guide.asp".

Microsoft Project 2002: A Simple Step to Easier Project Management, Microsoft Corporation, p. 1 (Aug. 8, 2002), at "http://www.microsoft.com/office/project/evaluation/indepth/newusers.asp".

Microsoft Project 2002: New Feature Guide, Microsoft Corporation, pp. 1-82 (2002), at "download.microsoft.com/download/msftproject2002/.doc/1/WIN98MeXP/EN-US/MSProj02.exe".

Microsoft Project: A Simple Step to Easier Project Management, Microsoft Project 2002: It's Easier Than You Think, Microsoft Corporation, 10 pages. (Aug. 2002), at "http://www.microsoft.com/office/project/evaluation/indepth/newusers.doc".

Microsoft(R) Project 2002: Product and Technology Catalog, Microsoft Corporation, pp. 1-3 (Dec. 9, 2002), at http://www.microsoft.com/catalog/display.asp?site=11121&subid=22&pg=2.

Microsoft(R) Project Standard 2002 Tour, 4 pages (Jun. 6, 2002), at http://www.microsoft.com/office/project/evaluation/standtour/.

OpenAir, "OpenAir Product Update," Sep. 21, 2000, OpenAir.com, p. 1-4.

OpenAir.com, Product Update—Jun. 21, 2001, http://web.archive.org/web/20011007153900/http//www.openair.com/home/n_p_update062101.html.10-2001.

PSA Products, Siebel eBusiness, 6 pages (Aug. 17, 2001—accessed Mar. 11, 2003), at "http://web.archive.org/web/20010720073029/www.siebel.com/psa/products.html".

Siebel Professional Services Automation: Empowering Services Organizations to Maximize Customer Satisfaction and Increase Revenue, Siebel eBusiness, 2 pages (Aug. 8, 2001—accessed Mar. 11, 2003), at "http://web.archive.org/web/20010718122037/www.siebel.com/psa/".

The Emergency Email Network, Inc., Resource Document #RC202903, published Jun. 11, 2002, http://web.archive.org/web/20020611220429/http://www.emergencymailnetwork.com/rc202903.html, pp. 1-7.

Tim Pyron, Special Edition Using Microsoft Project 2000, Sep. 2000, Que Publishing, Introduction, Chapter 4 and 20.

United States Patent and Trademark Office, Interim Guidelines for Examination of Patent Applications for Patent Subject Matter Eligibility, Oct. 2005.

* cited by examiner

Example PMSA-OPTSA Mapping

| PMSA Fields | Required? | Corresponding OPTSA Fields |
|---|---|---|
| Project Names | Y | Project Name |
| Project ID | Y | Project ID |
| Project Start Date | Y | Project Start |
| Project Finish Date | Y | Project Finish |
| Duration Format | Y | Duration Format |
| Resource Names | Y | Team Workbook USERID/Roles or Task Assigned To |
| Resource UID | Y | PMSA Resource Unique ID |
| Task Name | Y | Task Name |
| Task ID | Y | PMSA Task ID |
| Task Unique ID | Y | PMSA Task Unique ID |
| Task Outline Level | Y | Outline Level |
| Task Outline Number | Y | Outline Number |
| Task Predecessor | Y | Predecessor |
| Task Predecessor UID | Y | Predecessor PMSA Unique ID |
| Task Start Date | Y | Task Start |
| Task Duration | Y | Task Duration |
| Text28 | Y | Task Type |
| Text30 | Y | Task |
| Actual Finish | N | Task Actual End Date |
| Actual Start | N | Task Actual Start Date |
| Actual Work | N | Actual Work |
| Constraint Date | N | Constraint TS |
| Constraint Type | N | Constraint Type CD |
| Cost | N | Task Est Cost Amount |
| Email Address | N | Employee Email |
| Finish | N | Resource End Date or Task Planned End Date |
| Group | N | Group |
| Linked Fields* | N | Linked Fields |
| Milestone | N | Milestone |
| Notes | N | Task Note |
| % Complete | N | Task Complete Percentage |
| Percent Work Complete | N | Percent Work Complete |
| Remaining Work | N | Effort Remaining |
| Resource Group | N | Team Workbook Roles |
| Resource Initials | N | Resource Initials |
| Standard Rate | N | Resource Rate |
| Text 1 | N | Text A |
| Text 25 | N | Task Description |
| Text 26 | N | Task Status |
| Text 27 | N | Task Priority |
| Text 3 | N | Text B |
| Text 4 | N | Text C |
| Text 5 | N | Text D |
| Work | N | Work Duration |

*Fig. 6B*

EXCHANGING PROJECT-RELATED DATA IN A CLIENT-SERVER ARCHITECTURE

CROSS REFERENCE TO RELATED APPLICATIONS

The present patent application is a continuation of U.S. patent application Ser. No. 10/405,051 filed on Mar. 31, 2003, entitled "Exchanging Project-Related Data in a Client Server Architecture" and naming Jimin Li, Cory D. Wiegert, Kwong Ming Tse, Xuan Wei, James Gan Fong, and Matthew Philip Grumbach as the inventors. This application is assigned to Siebel Systems, Inc., the assignee of the present invention, and is hereby incorporated by reference in its entirety and for all purposes as if completely and fully set forth herein. This application also claims the benefit of provisional U.S. Patent Application No. 60/427,636 filed Nov. 18, 2002 and entitled "Exchanging Data With Software Applications," which is hereby incorporated by reference in its entirety.

This application is related to non-provisional U.S. patent application Ser. No. 10/334,681 filed Dec. 30, 2002 and entitled "Exchanging Project-Related Data Between Software Applications," which is hereby incorporated by reference in its entirety.

TECHNICAL FIELD

The following disclosure relates generally to exchanging data between software applications, and more particularly to techniques for a software application to exchange project-related data with other software applications in a client-server architecture, such as to exchange data between a software application with project planning capabilities and an unaffiliated software application of a related type from a third party.

BACKGROUND

As the number of commercial and custom software applications in use continues to increase, there are increasing benefits in being able to exchange data between different software applications. For example, it is often useful to be able to exchange data between different software applications of the same type (e.g., competing word processing applications), such as to allow users of one of the software applications to view and/or modify files created by other of those software applications. It can also be useful for applications of related but distinct types to be able to exchange data, such as if they can use the same types of data for different purposes and/or can use the data of the related application type to supplement the data to which they have access.

While various limited techniques exist to allow some software applications to exchange data with other software applications in certain limited situations, those techniques typically lack flexibility and functionality needed for many uses. For example, some companies may each provide multiple software applications (e.g., software applications of different types) that are designed to be able to exchange at least some types of data with each other in a proprietary manner, or such companies may similarly design their software applications to be able to proprietarily exchange at least some types of data with affiliated software applications of other affiliated companies (e.g., partners, subsidiaries, etc.). However, such techniques do not benefit users of software applications from unaffiliated companies in exchanging data with such software applications.

In addition, other limited techniques allow two unaffiliated software applications to exchange data if they are both designed to include the same developer-independent data exchange mechanism, such as each having the capability to store data in the same standardized data format (e.g., in a flat file or by using XML). However, such techniques do not benefit users unless both software applications that are to exchange data have been designed to use the same data exchange mechanism. Moreover, at least some such techniques include other disadvantages, such as an inability to fully represent the data that a software application stores in its own proprietary data files.

The existing limited techniques also typically require two unaffiliated software applications to both execute on the same computer system (e.g., simultaneously), which prohibits the use of those techniques in situations in which two software applications cannot be executed on the same computer system or in which one software application is installed remotely from another, and may also prevent remote users from using those techniques if they cannot access that single computer system. In addition, such existing techniques also typically have problems handling situations in which there are multiple users of one of the software applications, such as to prevent modification by one user of data that is in the process of being exchanged with another software application by another of the users and/or to synchronize with other users the data changes that are made by one of the users as part of an exchange.

While inter-application data exchange can be of benefit for many types of software applications and for many types of data, one category of software applications and data for which such data exchange can provide particular benefits includes software applications and data related to project planning and management. For example, various project management software applications ("PMSAs") are available (e.g., the Microsoft Project software application from Microsoft Corporation, the MinuteMan Project Management Software application from MinuteMan Systems, the PlanBee software application from Guy Software, etc.) that typically provide a variety of functionality related to the details of project planning and reporting, and in performing such functionality typically use data which can be of benefit to and/or available from a variety of other related types of software applications. Thus, the ability to exchange data with other such related types of software applications can provide a variety of benefits to a PMSA and to other related types of software applications.

In particular, the functionality provided by PMSAs typically allows users to define projects by identifying project members and other resources needed for a project, determining project-related tasks and inter-dependencies between tasks, assigning tasks to the project members and managing corresponding schedules, etc., and the data representing a defined project is typically stored in a data file in a format proprietary to the PMSA that was used. Other related types of software applications (e.g., customer relationship management software, employee relationship management software, software to support internal operations of a company such as payroll and human resources, calendar/scheduling software for individuals, high-level project tracking software for an organization, various reporting software, etc.) are often able to benefit a PMSA by providing relevant project-related data, and such other software applications often similarly benefit from the detailed project-related data available in defined projects. For example, a variety of project-related data can be used by and/or provided from these other related types of software applications, such as data about current and potential project members, current and potential project resources, schedules of project members, tasks assigned to project members, anticipated and past project-related milestones and other events or occurrences, etc. PMSAs are also often used by multiple users for a given project, such as multiple members of the project, and thus benefit from techniques that assist in the coordination and management of the access and use of the project-related data by the multiple users.

One related type of software application that receives and provides benefits from exchanging data with PMSAs is a high-level organizational project tracking software application ("OPTSA"). Such OPTSAs (e.g., Professional Services Automation software from Siebel Systems) typically provide a variety of functionality to enable service-based and other organizations to manage services engagements, project deliverables, resources, partners, and financials, such as by performing project portfolio, risk management, and financial analysis to help organizations ensure that projects are delivered on time and within budget. OPTSAs typically gather and integrate detailed information of various types, such as by gathering real-time information from all project members and retrieving information about current labor burn rates, fee analysis, resource availability, etc. Such OPTSAs may also be able to track and integrate information for many distinct projects within the organization.

Unfortunately, existing limited techniques for exchanging data between unaffiliated software applications are not generally applicable to project-related data between PMSAs and related software applications such as OPTSAs for various reasons, including the typical complexity of project-related data entities (e.g., resources and tasks, which may each have a variety of associated data items to represent scheduling and other related information for the task) and the inter-relationships between such data entities. For example, defined projects often have a complex hierarchical arrangement of task-related information (often referred to as a "work breakdown structure" or "WBS"), which may include multiple high-level project phases that each have multiple tasks and may have various interdependencies. In particular, each task may be related to a variety of other tasks within the project phase or in other project phases, such as to indicate dependencies in when tasks can be performed with predecessor and/or successor tasks, to indicate one or more child tasks to be completed as part of the current task and/or one or more parent tasks for which the current task has such a child relationship, to indicate other types of inter-task constraints, etc. The inability to easily exchange such project-related data between PMSAs and related software applications such as OPTSAs thus hinders their use, particularly between multiple users in an organization.

Accordingly, it would be beneficial to provide techniques for exchanging data between various related types of software applications, including between software applications with project planning and/or tracking capabilities from multiple unaffiliated companies (e.g., a PMSA from one company and an OPTSA from another company). In addition, it would be beneficial to provide techniques that facilitate data exchange with a software application in such a way as to allow remote users to easily access the data exchange techniques from remote locations, such as via a client-server architecture that allows multiple remote users.

BRIEF DESCRIPTION OF THE DRAWINGS

FIGS. 6A-6B provide examples of defining a mapping between PMSA project data file data fields and OPTSA database data fields.

DETAILED DESCRIPTION

I. Introduction

Figure 1:
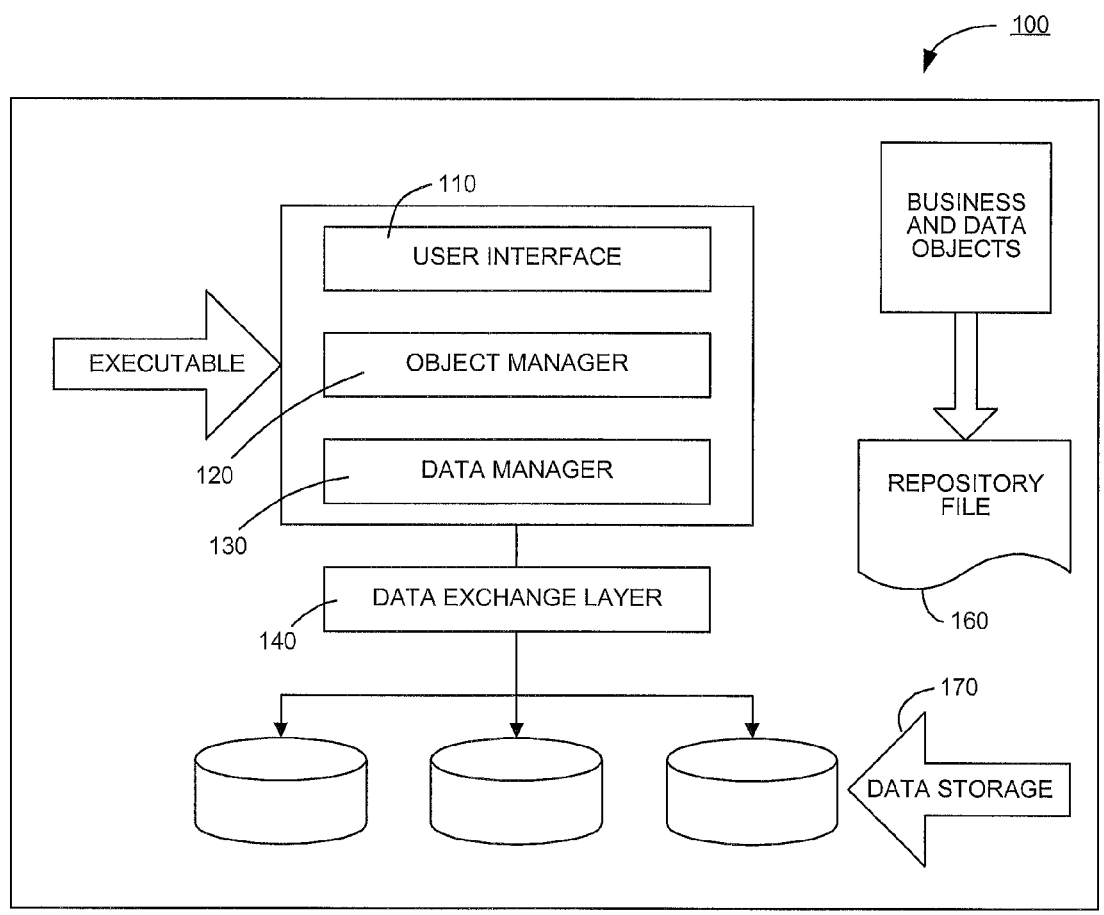
FIG. 1 shows a multi-layered system architecture within which the described techniques can be implemented.

A software facility and associated techniques are described below that assist in exchanging data between two or more software applications, such as project-related data between unaffiliated software applications. In some embodiments, project-related data is exchanged between a project management software application ("PMSA") and an organizational project tracking software application ("OPTSA"), such as to assist an OPTSA in exchanging data with an unaffiliated PMSA that does not include functionality to exchange data with the OPTSA. The data exchange may include, for example, importing project-related data from a project data file created by the PMSA (e.g., in a data format proprietary to the PMSA) into a project-related database used by the OPTSA and/or by exporting data (e.g., modified or enhanced data) from the OPTSA database (or "DB") to that same PMSA data file or to another data file usable by the PMSA (e.g., a new PMSA data file that uses the data format proprietary to the PMSA).

In addition, in some embodiments an architecture with multiple interacting computer systems is employed to provide various functionalities. For example, a client-server architecture may be employed that allows users of client computer systems (e.g., thin clients that have limited or no local capabilities to execute software applications and/or store associated application data) to access a remote server computer in order to interact with a PMSA executing on the server, to interact with an OPTSA executing on the server, and/or to invoke data exchange functionality available at the server for exchanging project-related data between the PMSA and OPTSA (e.g., by importing project-related data from a PMSA project data file into a OPTSA project-related DB and/or by exporting project-related data from the OPTSA DB to a PMSA project data file). Such a computing architecture with multiple interacting computing systems provides a variety of benefits, such as allowing software applications that are installed and/or executing on different computing systems (e.g., computing systems of different types, such as with different hardware, operating systems, application programs and other distinct functionality) to exchange data. Thus, remote users may be able to access a central server computing system to access exchanged data and/or to invoke data exchange functionality, such as from a remote client on which none of the software applications are installed and/or executing.

As discussed in greater detail below, the facility in some embodiments assists a user in defining a mapping and other related information to be used when exchanging data between two software applications. When the data exchange is to occur between a PMSA project data file and an OPTSA project database, for example, the user may define one or more corresponding OPTSA database data fields (e.g., specified columns of specified database tables) for each of some or all of the PMSA data file data fields. More generally, as described in greater detail below, the PMSA may represent each instance of a data entity defined for the project (e.g., of each defined resource and task) by including a number of data fields in the data file that store data for that entity instance. Each data item (e.g., task duration, task start date, resource name, etc.) of each data entity instance may have a corresponding data field in the data file that includes the value of that data item for that data entity, with the data fields able to be identified in the data file in various ways (e.g., one data field for each line of the data file, with each entity data item having a unique name that is included at the beginning of the line to identify the data field for the line).

In addition to indicating correspondences between PMSA data file data fields and OPTSA database fields, users may in some embodiments indicate additional information to be used when exchanging data. For example, while in some situations a value of a source data field may merely be stored in a corresponding destination data field of the other software application without modification, in other situations various processing may be performed as part of the data exchange (e.g., to change the data format, to select an appropriate one of multiple possible destination data fields that correspond to the source data field), and if so users may define such processing for each of various PMSA data file data fields and/or OPTSA database data fields. In addition, in some embodiments defined correspondences can be specified to apply only when importing data into the OPTSA database from a PMSA data file, to apply only when exporting data from the OPTSA database into a PMSA data file, or to apply during both importing and exporting of data for the OPTSA database. Also, in some embodiments ordering information can be specified for some or all PMSA data file data fields and/or OPTSA database data fields that is to be used when determining an order in which the values of those data fields are imported and/or exported. Some PMSA data file data fields and/or OPTSA database data fields may also be indicated as being required for import and/or export in some embodiments such that a correspondence must be available for use with those indicated data fields during the import or export in order to allow the import or export to be performed. Various other preferences and other information can also be specified in some embodiments for particular data field correspondences of a mapping or instead all correspondences of the mapping of a particular type, whether for all projects using the mapping or instead for specific projects, such as data formats to be used for the values stored during import and/or export (e.g., for time duration, whether to indicate the duration in minutes, hours, days, weeks, etc.), specified ways in which to report and/or handle errors during the import and/or export process, etc.

Also, as discussed in greater detail below, the facility in some embodiments supports various processing during import and/or export in order to facilitate use of the project-related data by multiple users and modifications to project-related data by both the PMSA and OPTSA. For example, in some embodiments "round-trip" data import/export is supported such that (a) project-related data can be imported from a PMSA data file into appropriate OPTSA database records; (b) imported project-related data can be modified and supplemented within the OPTSA database by OPTSA; (c) the modified and supplemented data can be exported to that same PMSA data file such that the previously existing data fields in that data file whose values were modified are updated within that data file to include the modified data and such that new data fields are added to that data file for the supplemented data; (d) the project data in the modified data file can be further modified and further supplemented by the PMSA; and (e) the project-related data in that same PMSA data file can again be imported such that the previously existing OPTSA database records whose values were further modified are updated to include the further modifications and such that new OPTSA database records are created for the further supplemented data.

In order to support data import/export, the facility in some embodiments tracks each data entity instance to determine during import and/or export whether that data entity previously existed in the destination, such as to use that information to determine whether to modify existing data or add new data in the destination. In some embodiments, such tracking is performed during both import and export by mapping a unique PMSA ID (or "identifier") for each data entity instance with a distinct unique OPTSA ID for each data entity instance, such as by storing the unique PMSA ID for a data entity instance in the OPTSA database along with other information for that data entity instance, and by storing the unique OPTSA ID for a data entity instance in the PMSA data file along with other information for that data entity instance. By tracking previously existing data entity instances that have been modified, inter-relationships between data entity instances that have been changed by the modification can be properly updated in the destination (e.g., when a task is promoted to be a parent of additional child tasks, is demoted to be a child of an additional parent task, has a change in its specified predecessors and/or successors, is deleted or added, etc.). In other embodiments, only a single unique ID may be used for the tracking of data entity instances, whether a PMSA ID or an OPTSA ID, such as if that ID is stored with or otherwise associated with the data for that data entity instance in both the PMSA data store (e.g., a PMSA data file) and the OPTSA data store (e.g., an OPTSA database).

Additional functionality can also be provided in some embodiments in which there are multiple users of one or more of the software applications in order to facilitate multi-user usage, such as to prevent modification by one user of data that is in the process of being exchanged with another software application by another of the users and/or to synchronize with other users the data changes that are made by one of the users as part of an exchange.

II. System Overview and Overall Architecture

In one embodiment, a computing system with which the facility is integrated can be logically structured as a multi-layered architecture as shown in FIG. 1. In particular, the logical multi-layered architecture as shown in FIG. 1 provides a platform for common services to support various applications. These services may include a user interface layer 110, an object manager layer 120, a data manager layer 130, and a data exchange layer 140.

The user interface layer 110 may provide the applets, views, charts and reports associated with one or more applications. In one embodiment, various types of clients can be supported via the user interface layer 110. These various types of clients may include traditional connected clients, remote clients, thin clients over an intranet, Java thin clients or non-Windows-based operating systems, HTML clients over the Internet, etc.

The object manager layer 120 may be designed to manage one or more sets of business rules or business concepts associated with one or more applications and to provide the interface between the user interface layer 110 and the data manager layer 130. In one embodiment, the business rules or concepts can be represented as business objects. The business objects may also be designed as configurable software representations of the various business rules or concepts, such as accounts, contacts, opportunities, service requests, solutions, etc.

The data manager layer 130 may be designed to maintain logical views of the underlying data and to allow the object manager to function independently of underlying data structures or tables in which data are stored. In one embodiment, the data manager 130 may also provide certain database query functions such as generation of structure query language (SQL) in real-time to access the data. In one embodiment, the data manager 130 is designed to operate on object definitions in a repository file 160 that define the database schema. The data storage services 170 provide the data storage for the data model associated with one or more applications.

The data exchange layer 140 may be designed to handle the interactions with one or more specific target databases and to provide the interface between the data manager layer 130 and the underlying data sources.

Figure 2:
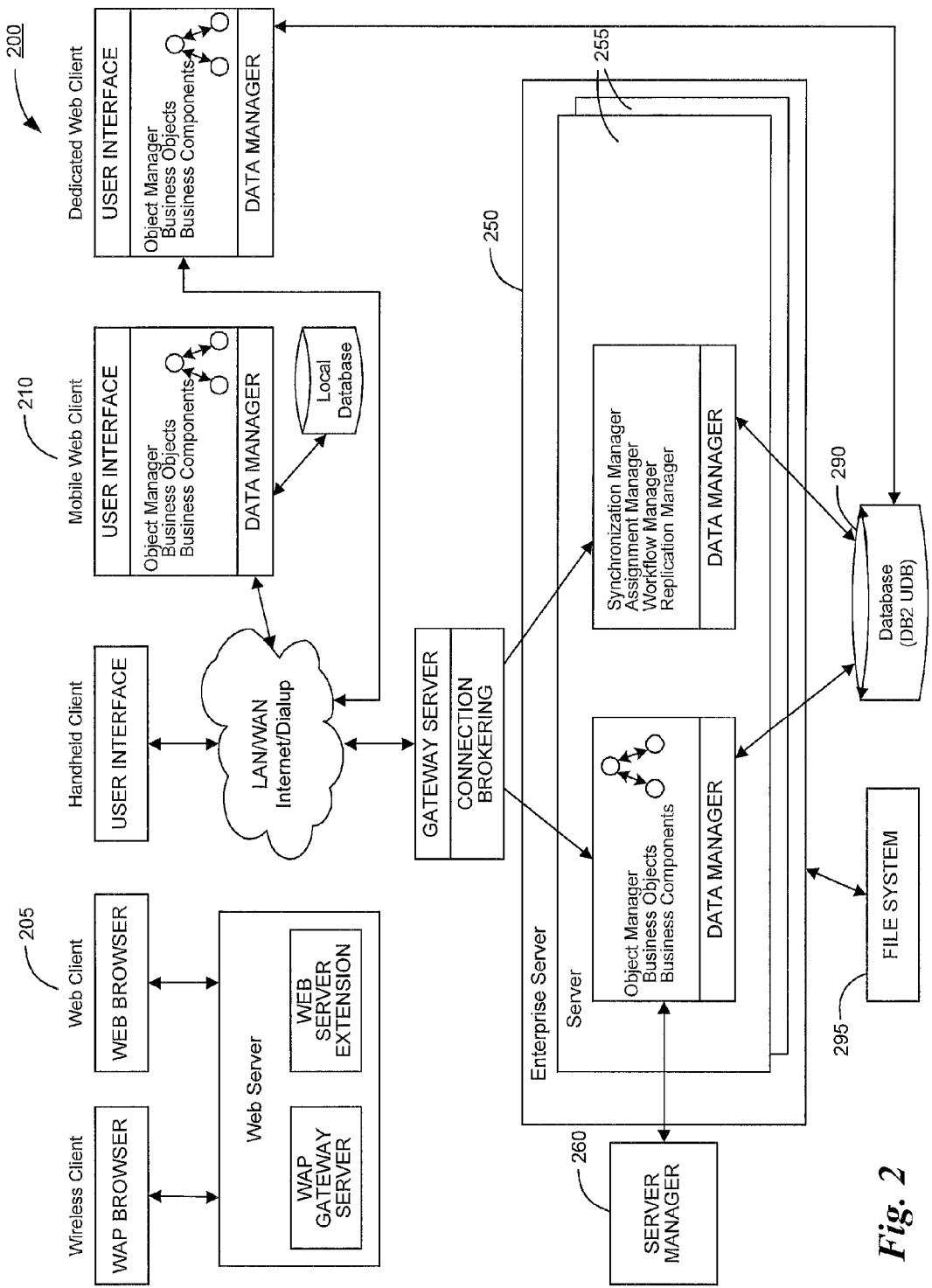
FIG. 2 shows a block diagram of one embodiment of a system configuration in which the described techniques can be implemented.

FIG. 2 shows a block diagram of one embodiment of a computing system configuration in which the facility can operate. In particular, the illustrated multi-layered architecture allows one or more software layers to reside on different machines. For example, the user interface, the object manager, and the data manager may all reside on the dedicated Web clients. For other types of clients such as the wireless clients, the object manager and data manager may reside on a system server. It should be appreciated and understood by one skilled in the art that the system configuration shown in FIG. 2 is for illustrative and explanative purposes, and may vary depending upon the particular implementations and applications of the described techniques.

In one embodiment, the system environment illustrated in FIG. 2 may include more than one database 290, and one or more subsets of the database can be created or replicated by a replication manager. In addition, mobile Web clients can have additional remote databases (also called local databases). In one embodiment, unless the remote or local databases associated with the mobile Web clients are defined as read-only databases, these mobile Web clients can create and update data locally that will be ultimately propagated up to the primary database when each mobile Web client synchronizes with the system server.

In one embodiment, the database 290 is designed to store various types of data including predefined data schema (e.g., table objects, index objects, etc.), repository objects (e.g., business objects and components, view definitions and visibility rules, etc.), and users' and customers' data. Dedicated Web clients and server components, including those that operate in conjunction with the other types of clients, may connect directly to the database 290 and make changes in real-time. In addition, mobile Web clients may download a subset of the server's data to use locally, and periodically synchronize with the server database through the system server to update both the local and the server database.

In some embodiments, various tables included in the database 290 may be logically organized into the following types: data tables, interface tables, and repository tables, etc. In addition, data tables may be used to store user business data, administrative data, seed data, and transaction data, etc. In one embodiment, these data tables may be populated and updated through the various applications and processes. Data tables may also include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:
the client application configuration;
the mapping used for importing and exporting data; and
rules for transferring data to mobile clients.

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated Web clients can read and write files directly to and from the file system 295. In one embodiment, mobile Web clients can have a local file system, which they synchronize with the server-based file system 290 periodically. In one embodiment, other types of client such as the wireless clients and the Web clients can access the file system 290 via the system server.

In one embodiment, the enterprise server 250 is a logical grouping of the system servers 255 that share a common table owner or a database, point to a common gateway server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile Web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, background, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers, individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing functions such as directing client connection requests to an appropriate server (e.g., the least-busy server).

In one embodiment, as illustrated in FIG. 2, the various types of clients that can be supported by the system may include the following clients: dedicated Web clients, mobile Web clients, Web clients, wireless clients, and handheld clients, etc.

In one embodiment, dedicated Web clients (also called connected clients) are connected directly to a database server for data access via a LAN or WAN connection. In one embodiment, these connected or dedicated Web clients do not store data locally. These dedicated Web clients can also access the file system directly. In one embodiment, the user interface, the object manager, and the data manager layers of the multi-layered architecture reside on the dedicated Web client.

In one embodiment, the mobile Web clients are designed and configured for local data access and thus can have their own local database and/or local file system. In one embodiment, mobile Web clients can interact with other components within the system via the gateway server. Through synchronization, the modifications from the local database and the server database can be exchanged.

In one embodiment, a Web client runs in a standard browser format from the client's machine. In one embodiment, the Web client can connect to a system server 255 through a Web server. In one embodiment, the system server 255 is designed and configured to execute business logic and access data from the database 290 and file system 295. In one embodiment, the Web client described herein is designed and configured to operate in an interactive mode. In one embodiment, the interactive Web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc.

In one embodiment, wireless clients are essentially thin clients enabled on wireless devices. The wireless clients can use a wireless application protocol (WAP)-based user interface to communicate and exchange information/data with the system server.

Figure 3:
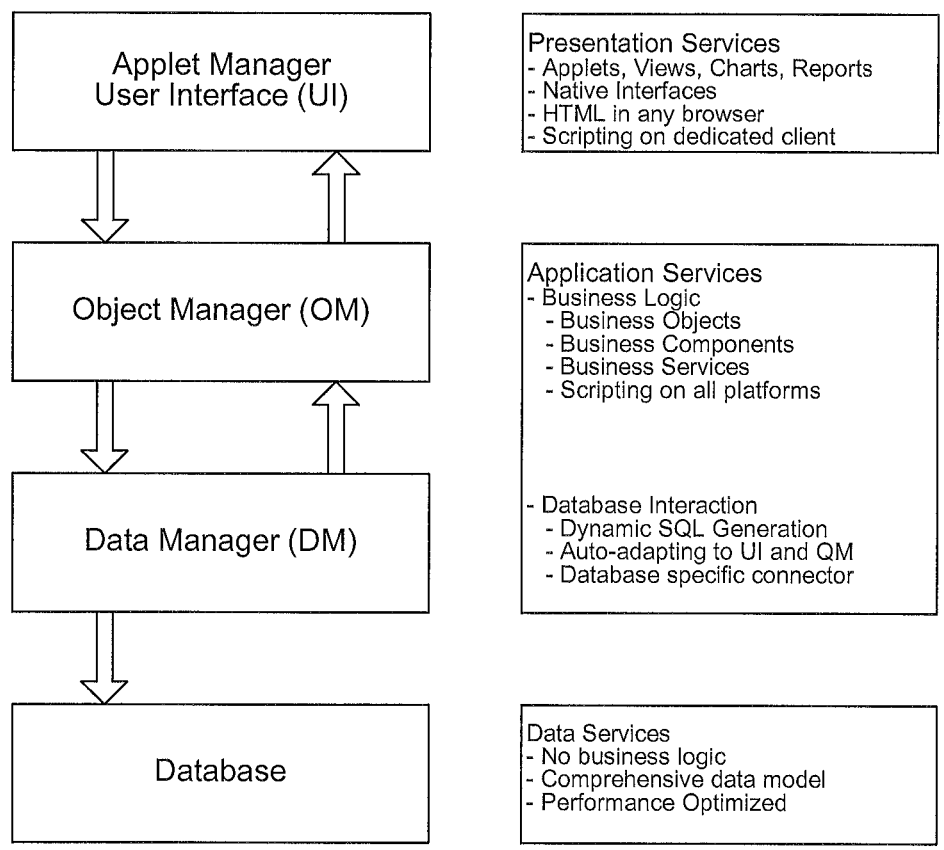
FIG. 3 shows a block diagram illustrating a logical representation of a multi-layered architecture within which the described techniques can be implemented.

FIG. 3 shows a block diagram illustrating another logical representation of a multi-layered architecture. Again, the multi-layered architecture as illustrated in FIG. 3 provides the configured platform for various common services designed and to support the various applications. In one embodiment, these various services may include presentation services which correspond to an applet manager and user interface layer, application services which correspond to an object manager (OM) layer and a data manager (DM) layer, and data services which correspond to a database layer.

In one embodiment, the presentation services may be designed and configured to support various types of clients and may provide them with user interface applets, views, charts, and reports, etc. As described above, a large variety of clients may be supported including wireless clients, handheld clients, Web clients, mobile Web clients, and dedicated (connected) clients, etc.

In one embodiment, the application services may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries) necessary to satisfy the request. For example, the data interaction services may be used to translate a call for data into DBMS-specific SQL statements.

In one embodiment, data storage services may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
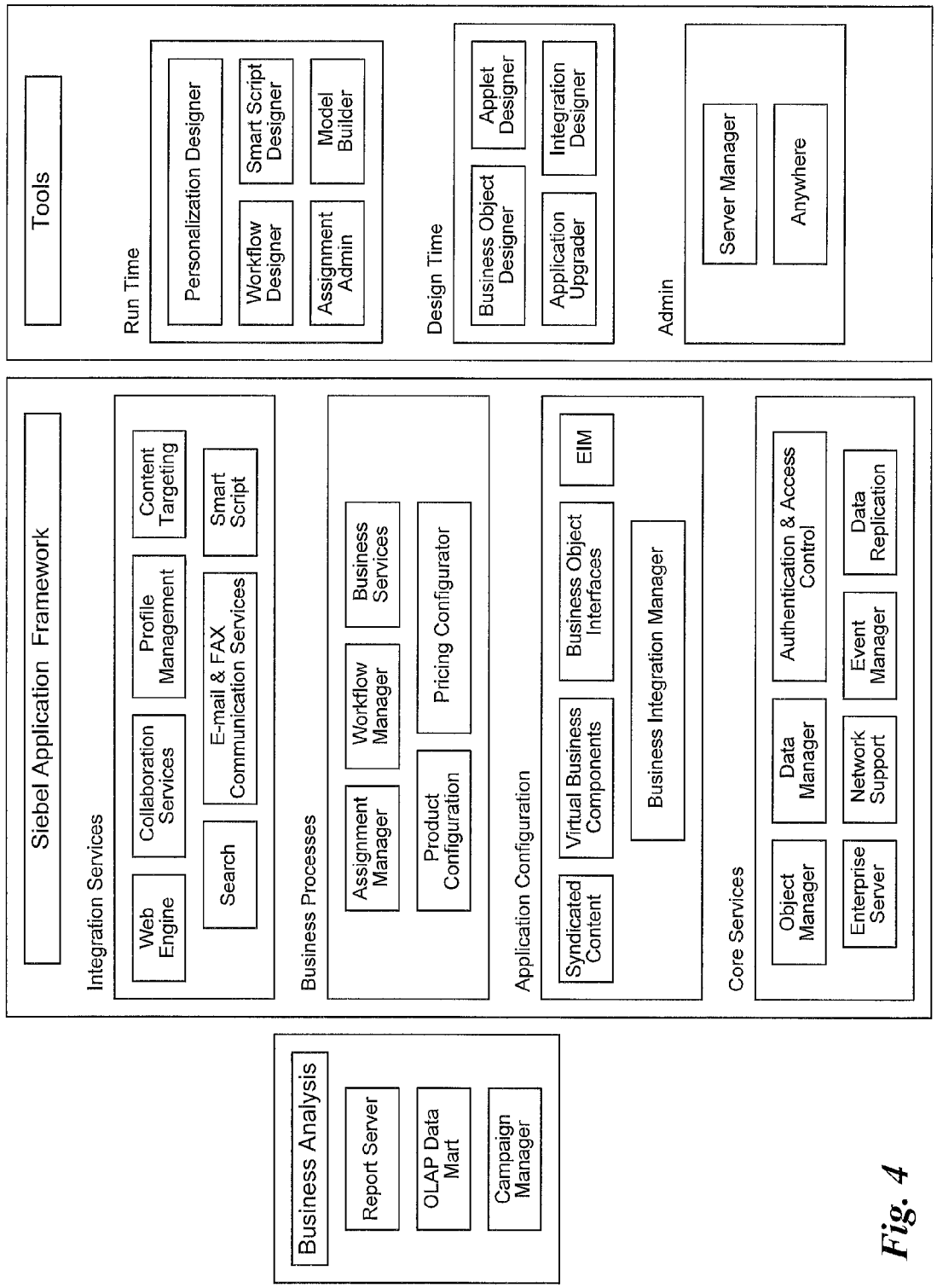
FIG. 4 illustrates a block diagram of one embodiment of an application framework within which the described techniques can be implemented.

FIG. 4 illustrates a block diagram of one embodiment of an application framework. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

the enterprise server, which is the middle-tier application server;
the networks that link all of these pieces together;
facilities like event manager and data replication, which allow sharing data between multiple installations of various applications as well as between the various applications and other external applications; and the authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information and a server having information requested from it.

In one embodiment, business processes services are designed and configured to allow the client to automate business processes through the application. In one embodiment, these various business process services may include the following:

assignment of tasks through Assignment Manager;
enforcement of business practices through Workflow Manager;
reuse of custom business logic through Business Services; and
ensuring proper product configuration and pricing through the Product Configurator and Pricing Configurator.

In one embodiment, creation of these business processes can be done through Run-Time tools such as Personalization Designer, Workflow Designer, SmartScript Designer, Assignment Administration Views, the Model Builder, etc.

In one embodiment, integration services may be designed and configured to provide the client with user interface and thin client support. In one embodiment, these may include capabilities for building and maintaining Web-based applications, providing Web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured to provide one place to monitor and administer the application environment. In one embodiment, these services allow the user to administer the application either through a graphic user interface (GUI) or from a command line.

III. Examples and Additional Details

While the described techniques for exchanging data can be used with a wide variety of types of software applications and types of data, in some examples discussed below one of the software applications is an OPTSA and another of the software applications is an unaffiliated PMSA, such as from an unrelated company and lacking functionality intended for exchange of data with the OPTSA. Thus, while some embodiments of the software facility are described below for illustrative purposes that include various specific details related to PMSAs and OPTSAs and to various types of project-related data, those skilled in the art will appreciate that the techniques of the invention can be used in a wide variety of other situations and that the invention is not limited to these details. In addition, in some examples discussed below a client-server computing architecture is used, such as to allow thin clients with limited capabilities to access functionality available on a remote central server computing system. However, those skilled in the art will appreciate that the techniques of the invention can be used in a wide variety of other computing architectures, including in a peer-to-peer environment or on a single stand-alone computer system.

Figure 5:
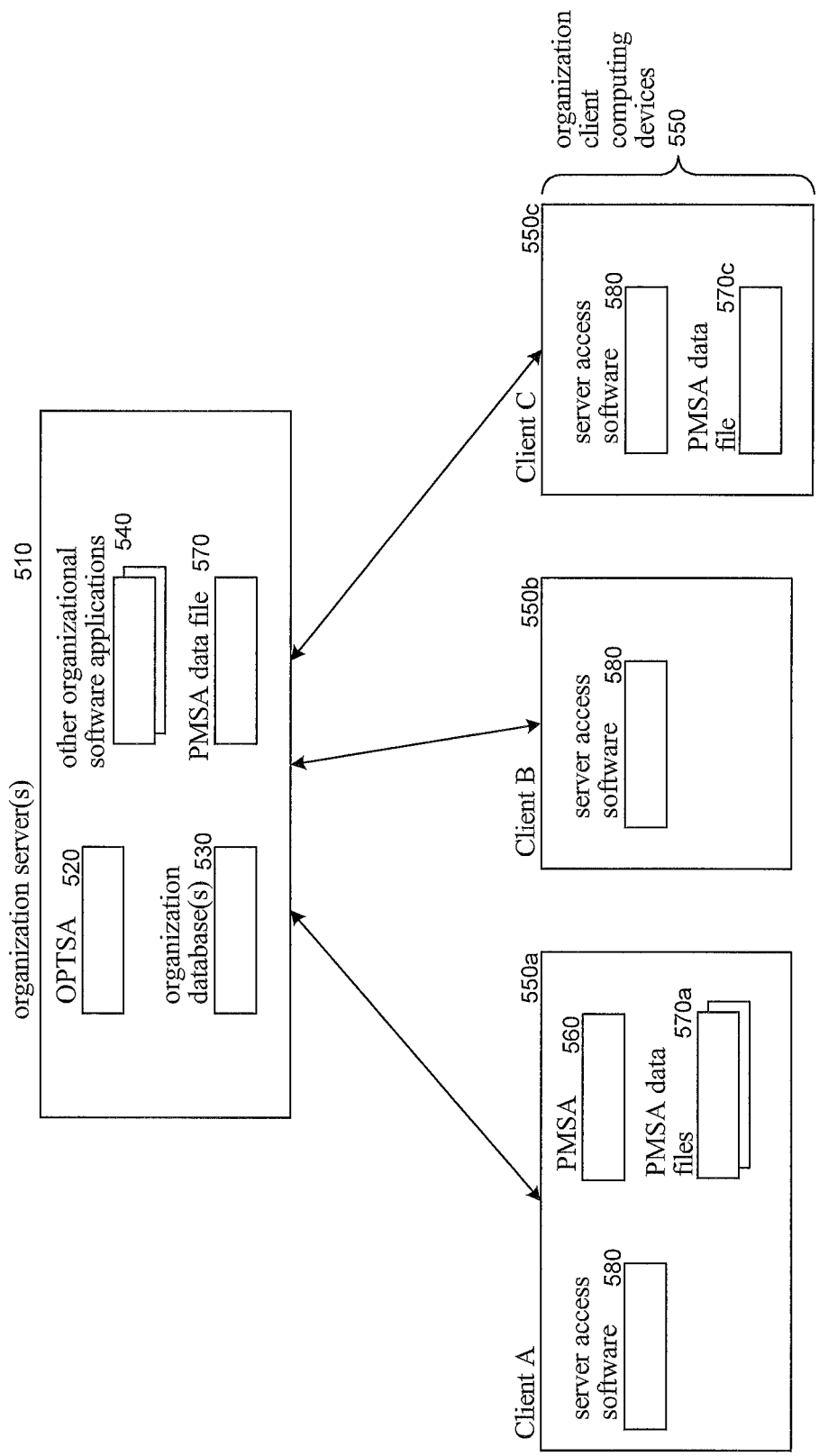
FIG. 5 illustrates an example network diagram of multiple computing systems of an organization interacting to perform the described techniques.

As one example of an environment in which the described techniques can be used, FIG. 5 illustrates an example network diagram of multiple computing systems of an organization interacting to perform the described techniques. In particular, in this example embodiment there are one or more organization server computing systems 510 that provide various types of information and other capabilities to users of the organization by interacting with various organization client computing devices 550 of those users. In this example embodiment, one or more of the organization servers are able to execute an OPTSA 520 and to provide related functionality for that software application to various users of the client computing devices. In particular, each of the illustrated client computing devices includes server access software 580, such as a Web browser or instead other software specific to the OPTSA, that allow users of the client computing devices to provide information to and receive information from the executing OPTSA on the server (although some or all of the client computing devices may at times not be connected to the organization servers, such as for mobile computing devices). One or more of the organization servers also have access to one or more organization databases 530 that store various information for the organization, such as information related to employees, customers, organizational projects, organizational resources, etc. Various other organizational software applications 540 may also be executing on one or more of the organization servers, and in other embodiments other computing architectures could instead be used, such as to link some or all of the client computing devices directly with each other (e.g., in a peer-to-peer or grid network).

In this example embodiment, only some of the client computing devices may have locally installed copies of PMSA software, such as the PMSA 560 executing on Client A 550a. Thus, a user of that client can execute the PMSA 560 to gain access to its capabilities even when not connected to the organization servers, such as to define the details of new projects and/or to modify existing projects (e.g., if the user is a team leader or other team member of the project(s) being defined). In this example embodiment, the PMSA stores information for each defined project in separate PMSA data files, which in this example embodiment are stored locally on Client A as PMSA data files 570a. Users of other client computing devices such as Client B 550b and Client C 550c, who in this example may be other members of a team for which the user of Client A defined a project data file, may desire access to the defined project data for various purposes, such as to view the project data (e.g., to update their personal schedule and other information to reflect tasks and activities assigned to them as part of the project) and/or to modify/add information in the project data file.

While in some embodiments the users of Clients B and C may gain access to defined project information by using PMSA software to view and/or modify the appropriate PMSA project data file (e.g., if a copy of the PMSA is executing on one of the organization servers, not shown here, and if an optional copy 570 of the PMSA project data file is stored on an organization server or if the users instead have access to the locally stored project data file 570a on Client A), in the example embodiment the users of Clients B and C will instead access the relevant project-related data via the OPTSA 520 on the organization servers. In particular, the project-related data from the appropriate PMSA project data file is accessed and imported into an appropriate project-related organization database 530, such as at the request of a user of Client B and C, and that user can then view and modify that project-related data via the accessible OPTSA. If changes are made to the project-related data by the user, those changes can later be exported back to a PMSA data file for later use by the user of Client A or other users.

While the modified project-related data in the organization database will typically be exported back to the same PMSA data file from which it was originally imported, such as to maintain a single copy of the PMSA data file as a master copy, in some situations and embodiments a user of Client B or C may instead export modified project-related data to a new PMSA project data file, such as local PMSA data file 570c on Client C. In this example, however, the original PMSA project data file 570a on Client A is modified to include the exported data from the OPTSA, and the user of Client A can then view the modified project-related data in the data file using PMSA 560, as well as making further changes or additions to the defined project if they desire. Any such further changes and additions may later be re-imported to the organization database 530 used by OPTSA (e.g., at the instruction of the user of Client A or based on a defined synchronization schedule). When a previously imported project data entity instance is changed by the user and re-imported, the change will cause the corresponding previously stored data entity instance in the organization database to be updated to reflect the change, and newly added data entity instances to the project-related data in the modified PMSA data file will result in new records being added to the organizational database.

Thus, multiple users can access and modify the project-related data for a project, and the differing capabilities of the PMSA and OPTSA can be used as appropriate and available, as can differing access to related data for the project. In other embodiments, none of the client computing systems may have a locally stored copy of the PMSA (such as PMSA 560 on Client A), such as if project-related functionality is accessed by clients only when they are connected to an organization server, and instead each client may access a copy of the PMSA executing on one of the organization servers (not shown here) as necessary in order to receive the same types of functionality described above.

For many PMSAs, defined tasks can be related in a hierarchical manner, and various information about the tasks can displayed by the PMSA in a graphical window. For example, various inter-relationships between tasks can be defined, such as to indicate predecessors/successors and parent/child relationships. Some or all tasks can also have additional defined details, such as a start date/time, end date/time, and expected duration. Various other project-related data may also be defined for the project, such as resources to be used in accomplishing tasks, users responsible for each of the tasks, various activities (or sub-tasks) for some or all of the tasks, etc.

Figure 6A:
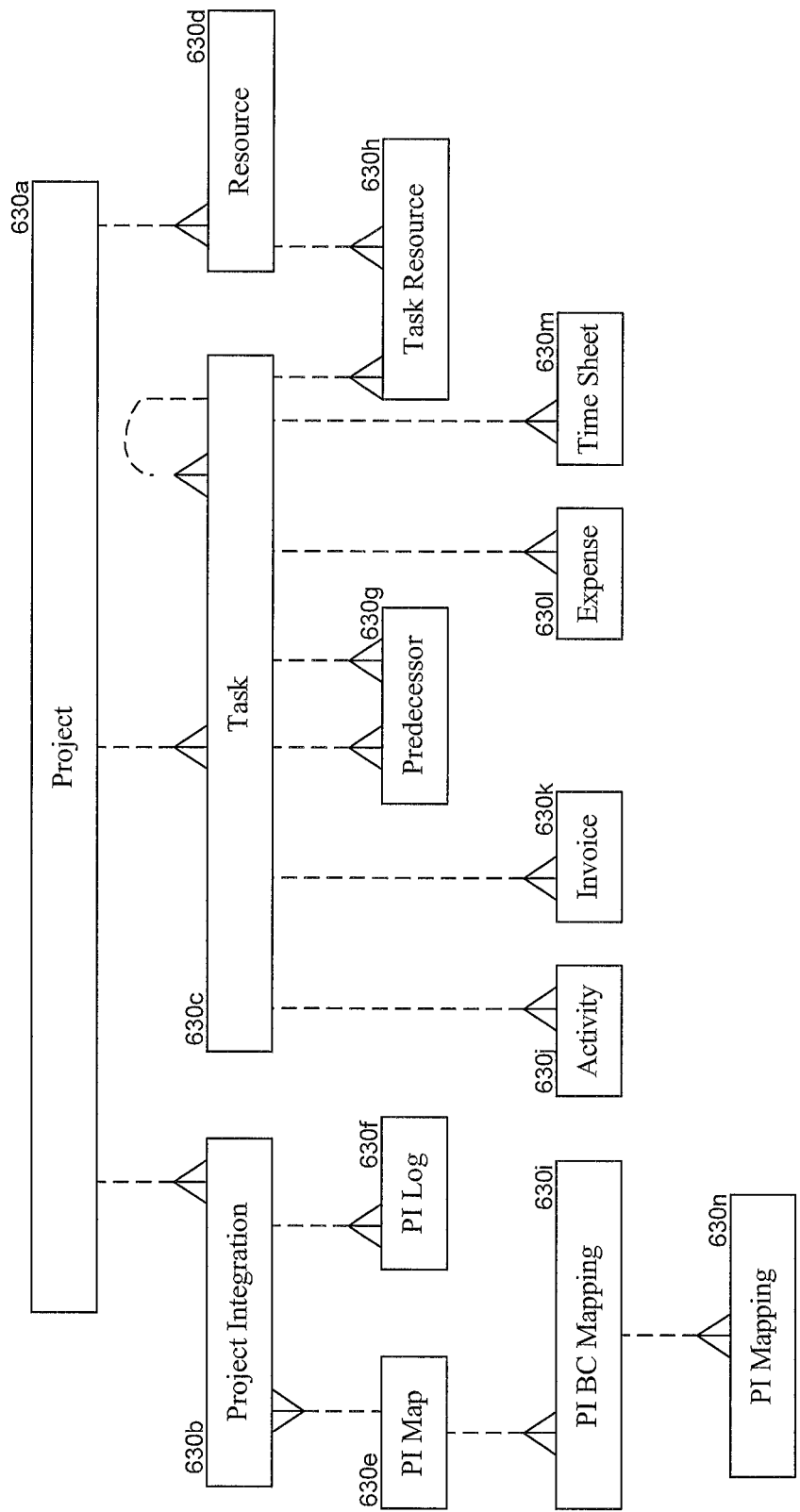

FIG. 6A illustrates an example OPTSA data model that can be used for the storage of project-related data, as well as to assist in the mapping of PMSA data fields to appropriate OPTSA database data fields. In particular, the example data model includes various inter-related database tables 630, which each include one or more data field columns. For example, the project table 630a may have an entry for each project, with data fields (or columns) for storing data items representing the overall project, such as a project name, unique project ID (e.g., the row ID of the entry for the project), start date, end date, and project-wide preference for the data format for a particular type of data. The task and resource tables 630c and 630d each contain one or more entries for each project, with each entry representing a task or resource data entity instance respectively within the project. Each of the tables 630c and 630d have data fields for storing data items for the data entity represented by a table entry, such as a name, corresponding project ID, unique PMSA ID for the corresponding data entity instance within the PMSA data file, etc. The project integration tables 630b, 630e, 630I and 630n store various information related to the mapping of database data fields to PMSA data file data fields, including the following: an identification of the PMSA data file corresponding to the project; correspondences between PMSA and OPTSA data fields; ordering information for the correspondences (e.g., sequence numbers to indicate a sequence in which the correspondences should be imported and/or exported); correspondence applicability information to indicate whether to use the correspondence for import, export, or both; etc. Various other project-related information can be stored in a similar manner.

FIG. 6B illustrates an example data exchange mapping 670 between an example PMSA and example OPTSA. The mapping 670 includes various example PMSA data file data fields 640 (e.g., for a data file of type ".mpp") and one or more corresponding example OPTSA data fields 660 for each such PMSA data field. In addition, in this example each correspondence entry also has a indication 650 as to whether a correspondence for that PMSA data field is required in this example, with correspondences 670a-670d indicated to be required and correspondences 670e and 670f being not required. As is shown, the example PMSA data fields include indications of various types of project-related data items, such as the PMSA data fields of correspondences 670a that correspond to the overall project, the PMSA data fields of correspondences 670b and 670c that correspond to defined project resource data entities, and the PMSA data fields of correspondences 670d that are some of the data fields corresponding to defined project task data entities.

In this example, each type of data entity for which multiple instances can occur in a project (e.g., tasks and resources) is given a unique identifier by the PMSA, as is shown in the PMSA data fields of correspondences 670c and 670g. In this example, the OPTSA will also generate a distinct unique OPTSA identifier for each such data entity instance, with a correspondence defined to an available (e.g., rarely used) data field of the data entity (e.g., in the example "Text30" PMSA data field of correspondence 670h). Other types of project-related data which are explicitly modeled in one of the software applications but not in the other can similarly have a defined correspondence to an available data field in the other software application (e.g., by storing OPTSA task type data in the example "Text28" PMSA data field of correspondence 670i).

If the PMSA and OPTSA data fields are both of the same data type and reflect the same conceptual information, no processing may be needed when exchanging data between those data fields, and the stored data value in one data field may be able to simply be copied to the corresponding data field. In other situations, however, additional processing may be needed during the import and/or export between two corresponding data fields, and if so additional processing to be performed can also be defined (but is not illustrated here).

Also, while most correspondences have a single PMSA data field corresponding to a single OPTSA data field (e.g., in correspondence 670c), in some embodiments correspondences that include other than a 1-to-1 relationship between PMSA data fields and OPTSA data fields are allowed, such as in correspondence 670b in which a single PMSA data field "Resource Names" corresponds to multiple OPTSA data fields. In this case, the example PMSA (e.g., MS Project) may store multiple types of information in a single PMSA data field, while the OPTSA (e.g., Siebel PSA software) may store such different types of information in different OPTSA data fields. For example, with respect to the "Resource Names" data field, the PMSA may store indications of both specific resources (e.g., particular users) for a task and a type of resource (e.g., a user role that does not have a particular user identified) to be used for a task (e.g., when the specific resource has not yet been identified) in the data field. In such situations in which a 1-to-1 mapping is not used, additional processing or other information can be provided to determine how to handle the multiple specified data fields (e.g., to select which of multiple possible destination data fields will receive the data from a corresponding source data field for a given instance of a data item for that data field, or conversely how to select or otherwise combine information from many source data fields to provide an appropriate data item for a destination data field).

While not illustrated here, a variety of additional types of information can also be specified for some or all such correspondences, as is discussed in greater detail below, such as whether a correspondence is to be used only for import of data from a PMSA data field to a corresponding OPTSA data field, only for export of data from a OPTSA data field to a corresponding PMSA data field, or for both import and export of data between the PMSA and OPTSA data fields. In other embodiments, information can also be specified to reflect an order of correspondences (or other PMSA data fields and/or OPTSA data fields) to be used when importing and/or exporting data.

Figure 7:
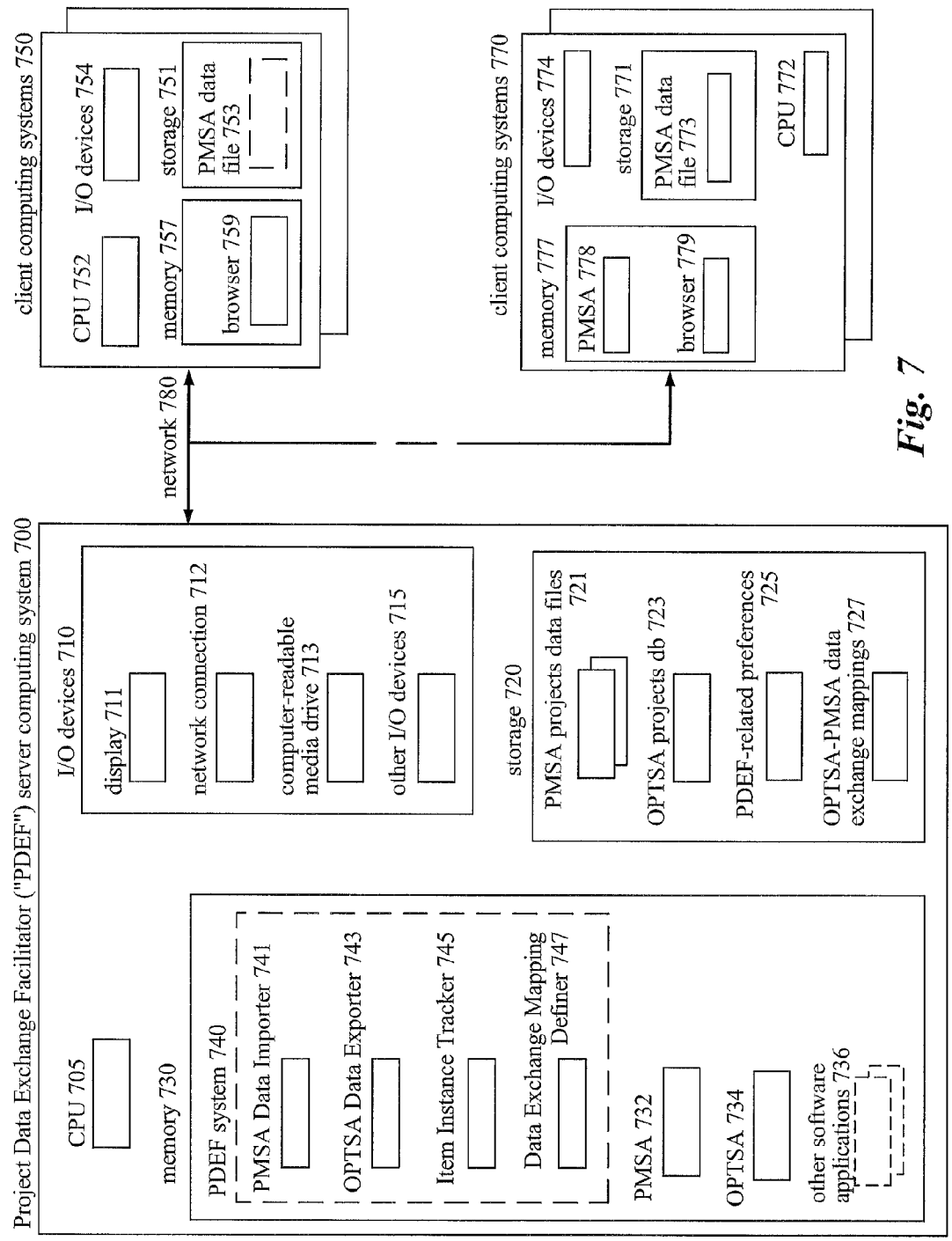
FIG. 7 is a block diagram illustrating an embodiment of a computing system able to provide the described techniques.

FIG. 7 is a block diagram illustrating an embodiment of a computing system that is able to provide the described techniques. In particular, a server computing system 700 is illustrated that is suitable for providing a Project Data Exchange Facilitation ("PDEF") system facility that provides the described techniques, as well as various client computing systems 750 and 770 that can communicate with the server. The server computer system includes a CPU 705, various I/O devices 710, storage 720, and memory 730. The I/O devices include a display 711, a network connection 712, a computer-readable media drive 713, and other I/O devices 715.

In this illustrated example, multiple users access the server computing system using various client computing systems in order to access project-related data and to obtain project-related data exchange capabilities, although in other embodiments a single computing system could instead provide the described techniques to one or more users. In this example, an OPTSA 734 is executing in memory 730, and it stores project-related information in an OPTSA projects database 723 on storage 720. Users of the client systems 750 and 770 may interact with the OPTSA 734 in various ways, such as via browsers 759 and 779 respectively executing in memory 757 and 777 respectively, and thus define, view and modify project-related data stored in the OPTSA database.

In other embodiments, the server may not execute an OPTSA, with users instead executing local copies to obtain desired functionality. Also, in some embodiments and/or situations, some of the client computing systems may not be connected to the server computing system at least some of the time, as is illustrated for example client computing systems 770. Moreover, some of the client computing systems in some embodiments may be thin clients that have limited or no computing capability and/or storage capability (e.g., may include only capabilities to communicate with the server and to perform I/O activities), while in other embodiments at least some of the client computing systems may be thick (or "fat") clients that have sufficient computing and storage capabilities to execute a local copy of a PMSA and to store one or more corresponding PMSA project data files.

A copy of a PMSA 732 is executing in memory 730 as well, such as to allow users of client computing systems that are not executing a copy of the PMSA to access and use the PMSA functionality, although in other embodiments the server may not execute a copy of the PMSA. Various other software applications 736 may also optionally be executing in memory 730. Users of clients 750 may access the PMSA 732 on the server in order to, for example, initially define a project whose data will be stored in a PMSA project data file (whether a server-based PMSA project data file 721 on storage 720 or an optional local PMSA project data file 753 on storage 751 of the client 750) as well as to view and modify existing PMSA data files (whether created by themselves or by other users, such as other members of a project to which the user belongs, as long as they have appropriate access privileges). Users of other client computing systems 770 that have a local copy 778 of a PMSA executing on the memory 777 of their client can instead use their local PMSA to define, view and modify project-related data if they so desire, with corresponding project data files stored either on the server or on the client. In some embodiments, client computing systems will execute a local copy of the PMSA only if they are not connected to the server, and if so any created or modified project data files may be stored locally (at least temporarily while the client is not connected to the server).

After one or more users have defined project-related data using a PMSA or the OPTSA, the exchange of project-related data between the PMSA and the OPTSA can be initiated (e.g., by one of the users). In the illustrated embodiment, an embodiment of the PDEF system facility 740 is executing in memory 730, and it includes a PMSA Data Importer component 741, an OPTSA Data Exporter component 743, an Item Instance Tracker component 745, and a Data Exchange Mapping Definer component 747. While the PDEF system is illustrated as optionally being a separate system from the OPTSA 734 in this example embodiment, it executes in conjunction with the OPTSA 734 in this example, and in other embodiments some or all of the functionality of the PDEF system may instead be incorporated directly within the OPTSA. In addition, in order for the PMSA and the OPTSA to communicate with the PDEF system and/or with each other, in some embodiments one or both of the software applications is configured to include inter-communication capabilities (e.g., Microsoft COM modules).

When a user instructs the PDEF system to initiate a data import to the OPTSA database from a PMSA data file, the system notifies the PMSA Data Importer component, which then loads the project-related data from the specified PMSA data file and processes each data entity instance in the data file in order to import the data in an appropriate manner to the OPTSA database. In the illustrated embodiment, the PMSA Data Importer component uses a mapping and other related information that was previously defined using the Data Exchange Mapping Definer component as part of the import process. The imported project-related data is then stored in the OPTSA projects database 723 as appropriate.

In order to define mappings and other related information to be used during the import and/or export process, users can access the Data Exchange Mapping Definer component. Defined mapping information can, for example, identify OPTSA database data fields that correspond to each of the PMSA data fields, specify an order in which the data in the PMSA data fields should be imported, define which of the PMSA data fields should be imported and which should not, define preferences such as types of data formats to use for specified types of data, etc. The Data Exchange Mapping Definer component stores the specified data field mappings in the OPTSA-PMSA data exchange mapping 727 on storage and stores any other defined preferences 725 (e.g., project-specific preferences) on storage 720.

In the illustrated embodiment, each data entity instance stored in the OPTSA project database receives a unique OPTSA ID that can be used in tracking which data entity instances have previously been imported into the database. In particular, when the OPTSA Data Exporter component is instructed by a user to export project-related data from the OPTSA project database to a PMSA data file, the OPTSA Data Exporter component stores the OPTSA IDs in the PMSA data file with the data file data entity instance to which the corresponding database record corresponds. In a similar manner to the PMSA Data Importer component, the OPTSA Data Exporter component uses the pre-defined mapping and related information to determine which OPTSA database data entity instances are to be exported to the PMSA data file, an order in which OPTSA data items are to be exported, and corresponding PMSA data file data fields to which each OPTSA database data item is to be stored.

When the PMSA Data Importer component later re-imports that modified PMSA data filed, the OPTSA IDs stored by the OPTSA Data Exporter component will be supplied to the PMSA Data Importer component along with the other project-related data, and the PMSA Data Importer component can then interact with the Item Instance Tracker component to identify corresponding existing records in the OPTSA database that are to be updated to reflect changes made to the project-related data in the PMSA data file.

Those skilled in the art will appreciate that computing systems 700, 750 and 770 are merely illustrative and are not intended to limit the scope of the present invention. More generally, a "client" or "server" may comprise any combination of hardware or software that can interact, including computers, network devices, internet appliances, PDAs, wireless and landline phones, pagers, electronic organizers, and various other consumer products that include intercommunication capabilities. The computing systems may also be connected to other devices that are not illustrated, including through one or more networks such as the Internet or via the World Wide Web (WWW). In addition, the functionality provided by the illustrated PDEF system facility may in some embodiments be distributed in additional components. Similarly, in some embodiments some of the described functionality and/or some of the illustrated components may not be provided and/or other additional functionality and components may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software applications and/or systems may execute in memory on another device and communicate with the illustrated computing system via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 8:
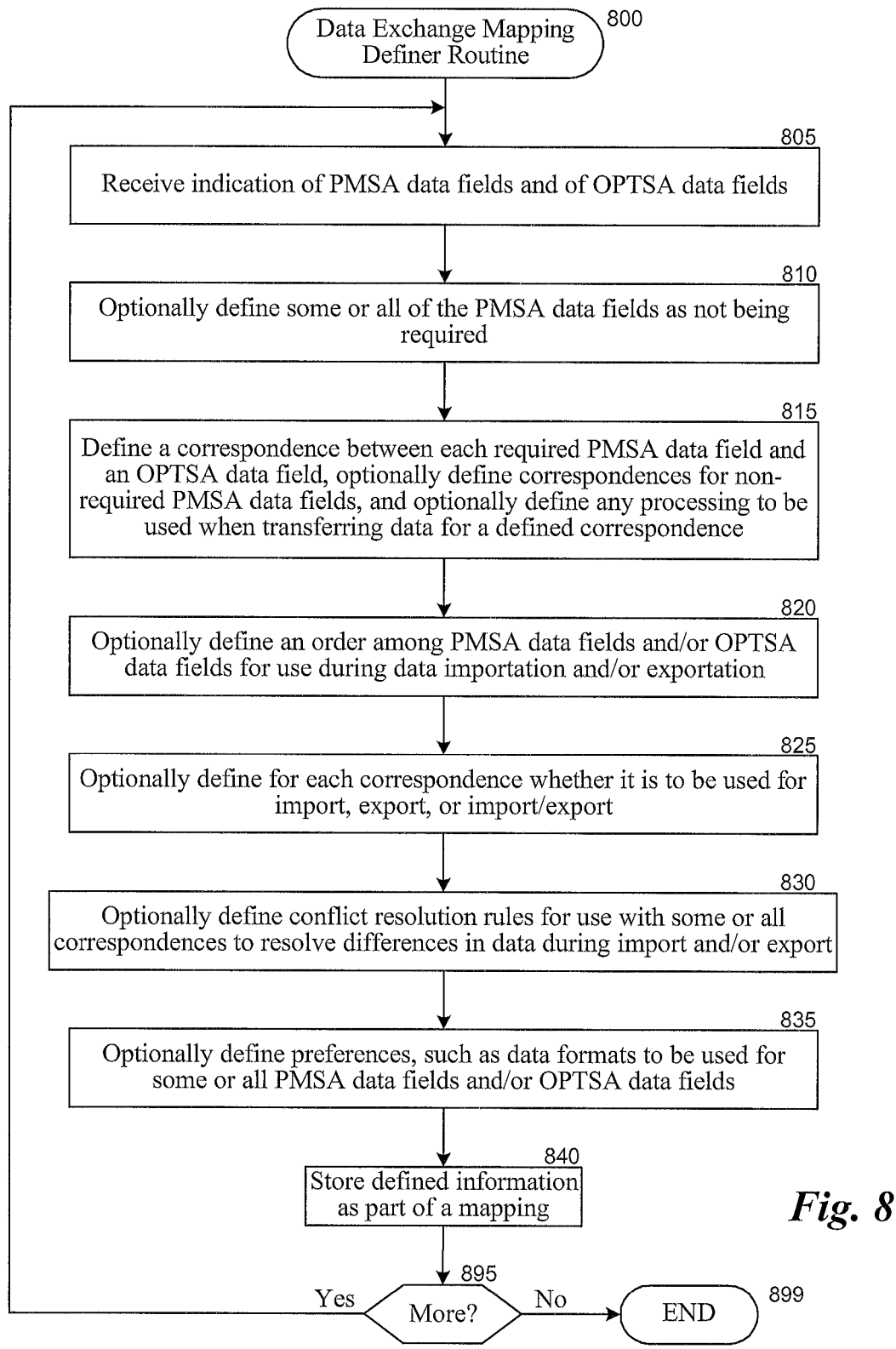
FIG. 8 is a flow diagram of an embodiment of the Data Exchange Mapping Definer routine.

FIG. 8 is a flow diagram of an embodiment of the Data Exchange Mapping Definer routine 800. The routine allows a user to define a mapping between types of data stored in a PMSA project data file and corresponding data fields in database tables of an OPTSA database, as well as to optionally define various other information that affects the import of project data from a PMSA data file and/or the export of data to a PMSA data file. In the illustrated embodiment, each PMSA data field is by default treated as being required to have a corresponding OPTSA database data field unless otherwise indicated, although in other embodiments different defaults may be used. Also, while in the illustrated embodiment the definitions of the various mapping-related information are provided based on user input, in other embodiments some or all of the defined information may instead be automatically determined in various ways.

The routine begins at step 805 where an indication is received of PMSA data fields and of OPTSA data fields for which mapping information will be defined. In some embodiments, a PMSA or OPTSA type may merely be specified, with pre-defined or accessible information about the data fields used by the indicated types of software applications retrieved and used by the routine. Conversely, explicit indications of the data fields may be received, or alternatively an actual PMSA project data file or OPTSA project database schema may be provided that includes sufficient information to determine the data fields used. Also, in some embodiments and situations, some or all of the defined information may be specific to identified projects and/or data files rather than applicable to all projects to which a defined mapping corresponds.

After step 805, the routine continues to step 810, where indications are optionally received from the user to define some or all of the PMSA data fields as not being required to have a corresponding OPTSA data field. After step 810, the routine continues to step 815 to define correspondences between each required PMSA data field and one or more OPTSA data fields based on received user instructions. Correspondences may also optionally be defined for non-required PMSA data fields. While in some embodiments and situations a correspondence may merely indicate the two data fields (e.g., when they store the same type of data and are intended to represent the same type of information), in other embodiments and/or situations additional processing may also be defined for some or all of the corresponding data fields, such as to manipulate source data field values in various ways in order to generate appropriate output data to be stored in the corresponding destination data field (e.g., based on values of one or more other data fields). Correspondences can be defined in various ways in various embodiments, such as based on pre-defined mapping templates that are selected by the user (e.g., based on the type of PMSA and/or the type of OPTSA) and/or by displaying lists of PMSA data fields and OPTSA data fields to the user and allowing the user to manually indicate each of the correspondences.

The routine next continues to step 820 to optionally define an order among the PMSA data fields and/or the OPTSA data fields to be used during data importation and/or exportation, such as based on an order for defined correspondences. Such ordering can be important in various situations, such as if a first data field value must be stored in the destination before a second data field value so that the second data field value can include a reference or link to the first data field value, or if dependencies exist between data fields such that the final resulting data in the destination will vary based on which data field value is first stored.

After step 820, the routine continues to step 825 to optionally define for each correspondence between PMSA data fields and OPTSA data fields whether it is to be used only during data import into the OPTSA database, only during data export from the OPTSA database, or during both import and export. The routine then continues to step 830 to optionally define conflict resolution rules for some or all of the defined data field correspondences for use in resolving differences in data values during import and/or export. For example, when a data item value that is being imported or exported has changed from a prior version stored in the destination, the prior version in the destination may be overwritten with the new changed data value—this is appropriate, for example, when only one of the PMSA data file and OPTSA database is treated as a master copy of the project-related data at a time such that any changes made to other non-master copies will be overwritten by the data in the master copy. In addition to simple conflict resolution rules such as selecting one of multiple possible data item values as the master value that will overwrite any other different values for the data item, conflict resolution rules can also perform a variety of more sophisticated types of processing (e.g., analyzing both possible data item values as well as other conditions and criteria in order to determine a data item value to use).

After step 830, the routine continues to step 835 to optionally define various preferences for use when importing and/or exporting data between the PMSA and OPTSA, such as data formats to be used for specific data fields or instead all data fields of a specified type (e.g., to specify durations of time as minutes or hours or days or weeks). In some embodiments, such preference information can be specified on a per-project basis, and if so may be stored separately from other defined information for the mapping. After step 835, the routine continues to step 840 to store the various defined information as a mapping for use between the PMSA and OPTSA, and then continues to step 895 to determine whether to continue. If so, the routine returns to step 805, and if not the routine continues to step 899 and ends.

In the illustrated embodiment, different mappings can thus be created and stored for different PMSAs and OPTSAs, although in other embodiments the OPTSA database may be designed to support a single particular PMSA and may not import data from other PMSAs (or different database tables will be used for different PMSAs). In addition, while not illustrated here, in other embodiments users can also modify previously defined mapping information. While such mapping information may in some embodiments be pre-defined by an administrative user before data import/export occurs and rarely if ever modified, in other embodiments the mappings may be defined as part of the project data import or export process and/or the mappings may be defined by one or more non-administrative users.

Figure 9:
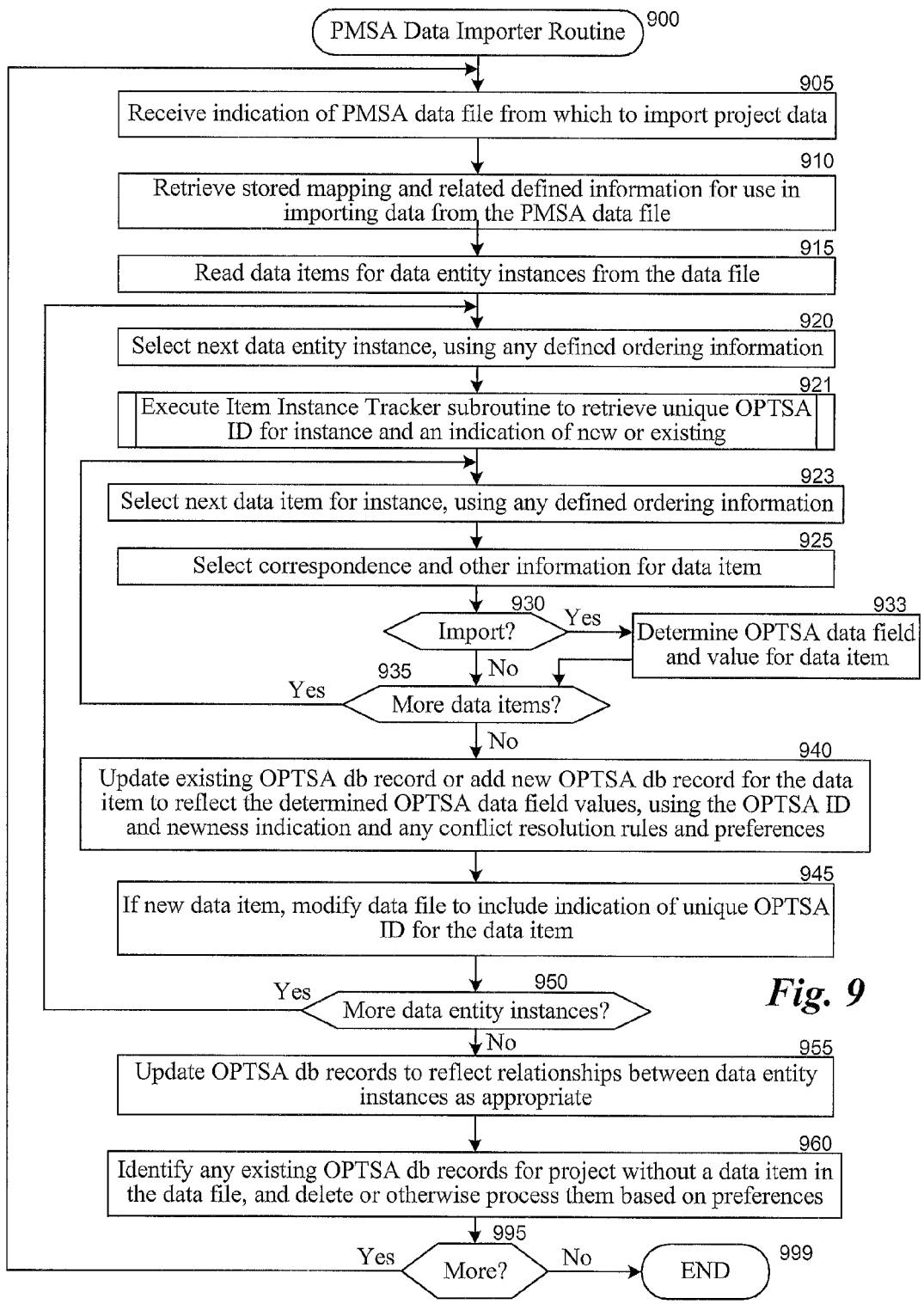
FIG. 9 is a flow diagram of an embodiment of the PMSA Data Importer routine.

FIG. 9 is a flow diagram of an embodiment of the PMSA Data Importer routine 900. The routine imports project-related data from a PMSA data file into an OPTSA database based on a previously defined mapping and other related information. In the illustrated embodiment, the routine executes in conjunction with an OPTSA that stores data in a single OPTSA database (e.g., as part of the OPTSA program), and thus does not receive or use indications of the OPTSA database to use, although in other embodiments an OPTSA database could be indicated, such as if a single OPTSA uses multiple databases and/or the routine operates in conjunction with multiple OPTSAs.

The routine begins at step 905 where an indication is received of a PMSA project data file from which to import project-related data. The routine continues to step 910 to retrieve stored mapping and related defined information for use in importing data from the PMSA data file. The appropriate stored information can be identified in various ways, such as based on the type of the PMSA, on the specific data file, on a project associated with the data file, on a user indicating to perform the import, etc. The routine then continues to step 915 to read the indicated data file to identify the various represented data entity instances that have stored data item values for the project and any other information for the project to which the data file corresponds.

In steps 920-950, the routine loops and process each of the data entity instances from the data file for import, although in other embodiments various pre-processing may first be performed, such as to organize the data entity instances and/or their data items (e.g., constructing a data structure or other layout for hierarchical or otherwise related data items that can be used to identify the relationships) and/or to delete extraneous information. In the illustrated embodiment, the routine next continues to step 920 to select the next data entity instance from the data file to be processed, beginning with the first and using defined ordering information (if any) to select which data entity instance should be next processed. While not illustrated here, in some embodiments some data entity instances may not be imported, such as by not selecting them in step 920 (e.g., based on the defined mapping).

The routine then continues to step 921 to execute the Item Instance Tracker subroutine to retrieve a unique OPTSA ID for the data entity instance if one is present in the data file and optionally an indication of whether the data entity instance previously existed in the OPTSA database or is instead new relative to the database (which may in some embodiments be determined based merely on whether an OPTSA ID was retrieved). As described in greater detail with respect to the Item Instance Tracker subroutine in FIG. 11, in the illustrated embodiment data entity instances are tracked by the OPTSA based on a unique identifier given to each data entity instance stored within the OPTSA database. However, other means for tracking data entity instances could instead be used in other embodiments (e.g., a unique PMSA ID), and if so this routine could be modified to use other related types of information provided by the subroutine to track a data entity instance and to indicate whether it was new or existing.

The routine then continues to step 923 to select the next data item for the selected data entity that is to be processed, beginning with the first and using defined ordering information (if any) to select which data item should be next processed. In step 925, the routine then selects from the retrieved mapping a correspondence (if any) for this data item to one or more destination data field(s) as well as any other information to be used in importing a value for this data item (e.g., indications of processing to be performed), such as based on the data field in the data file for the data item. In step 930, the routine then determines whether the data for this data item is to be imported to the OPTSA database, such as based on whether an appropriate correspondence was identified in step 925 and on any defined import/export information for the selected correspondence. If the data item is to be imported, the routine continues to step 933 to determine the destination data field and an appropriate value to be stored in that field based on the selected correspondence, and in some embodiments may also validate the determined data value as appropriate for the OPTSA data field. After step 933, or if it was instead determined in step 930 not to import the data item, the routine continues to step 935 to determine whether there are more data items to be processed for the selected data entity instance, and if so returns to step 923.

After it is determined that all of the data items for the selected data entity instance have been processed, the routine continues to step 940 to update the previously existing OPTSA database record based on the received OPTSA ID if the data entity instance previously existed or to add a new OPTSA database record if the data entity instance is new. The updating or adding is performed so as to include the values for OPTSA data fields that were determined in step 933 and using appropriate mapping information for the data entity instance (e.g., any specified processing, conflict resolution rules and preferences). The appropriate existing OPTSA database record to update is identified by matching the retrieved OPTSA ID (if any) to the OPTSA database record to which that ID is associated. When new OPTSA database records are added for a data entity instance, a unique OPTSA ID for the data entity instance will be associated with those new records (e.g., such as automatically if the ID is based on database information about the record such as a row ID). In some embodiments, a previously existing OPTSA database record that corresponded to the selected data entity instance may no longer be present, such as if a user of the OPTSA deleted that data entity instance from the project after a previous export of project-related data to the PMSA data file. If so, the routine can handle the selected data entity instance in various ways in different embodiments (e.g., based on any defined conflict resolution rules), including adding a new OPTSA database record for the selected data entity instance, declining to store any information for the selected data entity instance in the OPTSA database, generating an error or other status message for review and/or handling by a user, etc.

After step 940, the routine continues to step 945 to, if the currently selected data entity instance is new relative to the OPTSA database, modify the PMSA data file to include an indication of the unique OPTSA ID for the data entity instance. The OPTSA ID is added to the PMSA data file in a manner that is compatible with the format used by the data file, such as by using an optional or otherwise unused data field for the PMSA data entity so that the PMSA can later read the modified data without problem and will retain the indication of the OPTSA ID if that PMSA data entity instance is later changed by the PMSA. In other embodiments, any such modifications to the PMSA data file may instead be made for all of the data entity instances in the data file at a single time after they have all been processed. Conversely, in some embodiments the OPTSA ID information may not be added back to the PMSA data file as part of the data import process, such as if the appropriate information will be stored in the OPTSA database and will be later added to the PMSA data file in an appropriate manner when a data export process to that PMSA data file occurs, or if a unique PMSA ID will instead be used alone to determine whether a PMSA data file data entity instance previously existed in the OPTSA database (e.g., if the PMSA ID is stored in an appropriate column for OPTSA data entity instance records).

After step 945, the routine continues to step 950 to determine if there are more data entity instances from the data file to be processed, and if so returns to step 920. If not, the routine continues to step 955 to determine if any OPTSA database records that were updated or added during the current data import process need to be updated, such as to include references to other OPTSA database records (e.g., to represent relationships between data entity instances). If so, those database records are updated as appropriate to include the references. For example, project tasks are often related to multiple other tasks in various ways, such as by having one or more predecessor tasks, one or more children tasks, one or more parent tasks, etc. In other embodiments and situations, other related techniques could instead be used to address this problem, such as by performing additional processing in step 940 to update the various database records as appropriate to eliminate the second pass over the affected database records.

After step 955, the routine continues to step 960 to handle any previously defined OPTSA database records for the project that are no longer applicable, such as if a data entity instance that was previously imported into the OPTSA database has now been deleted from the project from within PMSA (and thus with the PMSA data file no longer including data items for the data entity instance). If any such OPTSA database records are identified, they are deleted or otherwise processed as appropriate to indicate their current status. In some embodiments, at least some such OPTSA database records are retained to allow information about the data entity instance to be available for reports and other related purposes (e.g., for tracking time spent and/or expenses), and if so such database records may be marked to indicate that they are to be retained for such purposes (e.g., with a flag) even though they no longer reflect the current project data. For example, if a previously imported task data entity instance is deleted from the project from within PMSA, in some embodiments the stored local representation of that task instance in the OPTSA database is checked to see if it has associated activity, time, expense or invoice information. If the task instance has no such associations, its stored local representation is deleted from the database, but if any such associations exist, the stored local representation of the task instance is instead marked so that it will not be considered a current part of the project but is retained in the database (e.g., but setting a flag so that it is not deleted). Such retained but non-current database records may also in some embodiments be treated as read-only.

After step 960, the routine continues to step 995 to determine whether to continue. If so, the routine returns to step 905, and if not the routine continues to step 999 and ends. In some embodiments, the routine waits to receive additional requests to import project data, such as from another process (not shown) that may queue and/or otherwise manage such requests when they are received.

Figure 10:
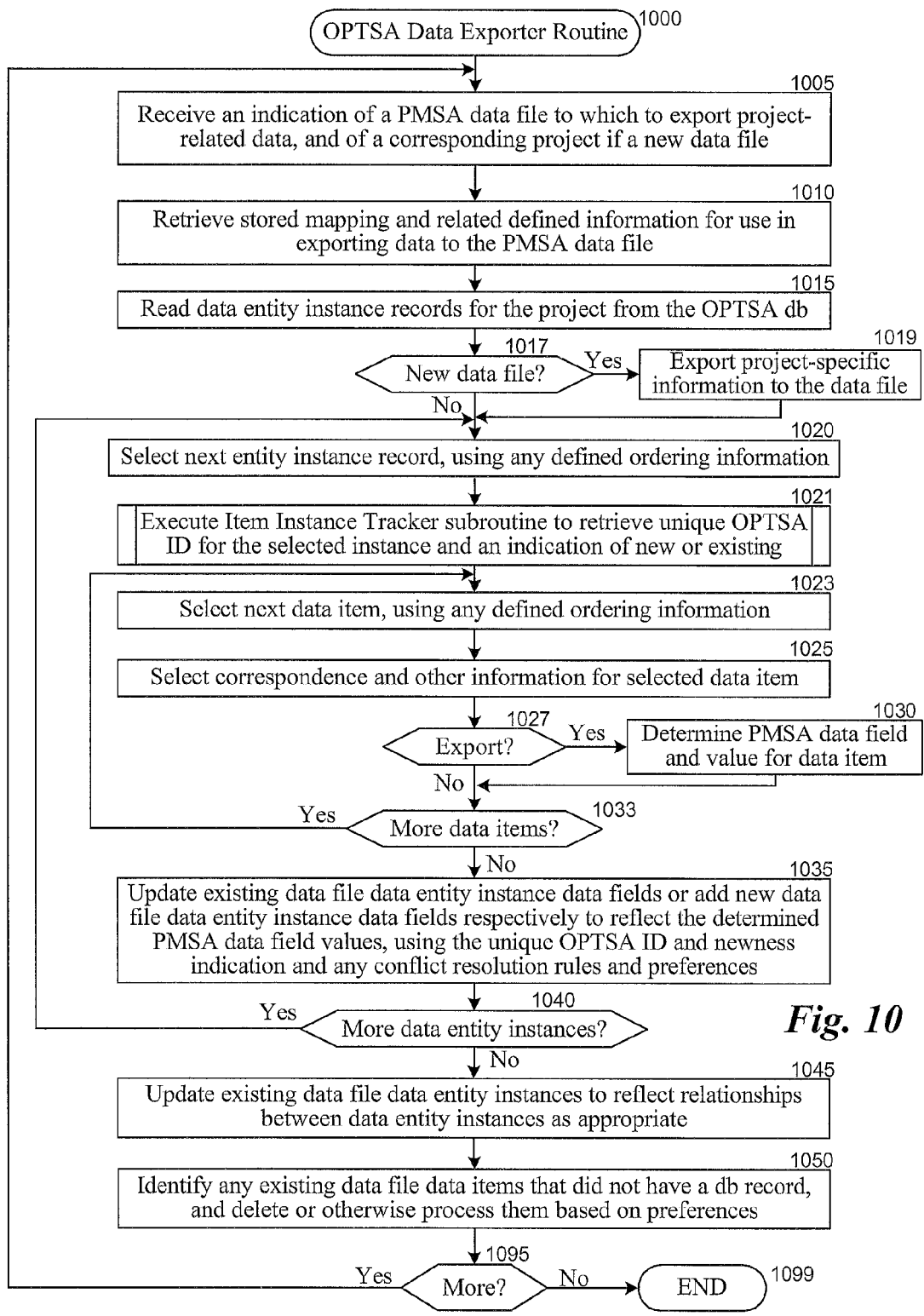
FIG. 10 is a flow diagram of an embodiment of the OPTSA Data Exporter routine.

FIG. 10 is a flow diagram of an embodiment of the OPTSA Data Exporter routine 1000. In a manner similar to that of the PMSA Data Importer routine illustrated in FIG.

9, the routine uses pre-defined mapping information to export project-related data from an OPTSA database to a PMSA data file.

The routine begins at step 1005, where an indication is received of a PMSA data file to which project-related data is to be exported from the OPTSA database, as well as an indication of the project whose data is to be exported if the OPTSA database stores data for multiple projects and the specified PMSA data file is a new file. In the illustrated embodiment, if data for a project has previously been imported from the indicated PMSA data file, the OPTSA database can store that relationship so that the project need not be specified each time data is to be exported to that PMSA data file. After step 1005, the routine continues to step 1010 to retrieve stored mapping and related defined information for exporting data to the PMSA data file, and in step 1015 reads the data records from the OPTSA database that correspond to the data entity instances of the project and any other project-related information to be written to the data file.

The routine next determines in step 1017 if the PMSA data file indicated in step 1005 is a new file, and if so continues to step 1019. In the illustrated embodiment, PMSA data files include a variety of project-related information in addition to information about the defined project data entity instances for the project, including a work breakdown structure for the project. When exporting data to an existing PMSA data file for the project in such embodiments, this various other project-related information will be present in the data file and need not be added. However, such various other project-related information will not be present in a new PMSA data file to which project data is to be added, and thus in step 1019 such project-related information is exported to the data file. In the illustrated embodiment, such other project-related information is captured during the data import process from a PMSA data file and is stored in the OPTSA database for use in creating new PMSA data files. After step 1019, or if it was instead determined in step 1017 that the indicated data file was not a new file, the routine continues to step 1020.

In steps 1020-1040, the routine loops and processes each of the project database records representing data entity instances for export to the PMSA data file, although in other embodiments various pre-processing may first be performed, such as to organize the data entity instances and/or their data items and/or to delete extraneous information. In the illustrated embodiment, in step 1020 the routine selects the next data entity instance to be exported, beginning with the first and using defined ordering information (if any) to select which data entity instance should be next processed. While not illustrated here, in some embodiments some data entity instances may not be exported, such as by not selecting them in step 1020 (e.g., based on the defined mapping). The routine then continues to step 1021 to execute the Item Instance Tracker subroutine to retrieve a unique OPTSA ID for the data entity instance and optionally an indication of whether the data entity instance previously existed in the PMSA data file or is instead new relative to the data file (which may in some embodiments be determined based on whether the database record includes an identifier for the data entity instance supplied by the PMSA). As described elsewhere, while data entity instances are tracked in the illustrated embodiment based on unique OPTSA identifiers, other means for tracking data entity instances could instead be used in other embodiments.

The routine then continues to step 1023 to select the next data item for the selected data entity that is to be processed, beginning with the first and using defined ordering information (if any) to select which data item should be next processed. In step 1025, the routine then selects from the retrieved mapping a correspondence (if any) for this data item to one or more destination data field(s) as well as any other information to be used in exporting a value for this data item (e.g., indications of processing to be performed), such as based on the data field in the database record for the data item. In step 1027, the routine next determines whether the data for this data item is to be exported to the PMSA data file, such as based on whether an appropriate correspondence was identified in step 1025 and on any defined import/export information for the selected correspondence. If the data item is to be exported, the routine continues to step 1030 to determine the destination PMSA data field and an appropriate value to be stored in that field based on the selected correspondence, and in some embodiments may also validate the determined data value as appropriate for the PMSA data field. After step 1030, or if it was instead determined in step 1027 not to export the data item, the routine continues to step 1033 to determine whether there are more data items to be processed for the selected data entity instance, and if so returns to step 1023.

After it is determined that all of the data items for the selected data entity instance have been processed, the routine continues to step 1035 to update the corresponding existing data entity instance in the data file (if any) or to add a new data entity instance to the data file, with the updating or adding performed so as to include the values for PMSA data fields that were determined in step 1030 and using appropriate mapping information for the data entity instance (e.g., any specified processing, conflict resolution rules and preferences). The appropriate existing PMSA data file data fields to update are identified by matching the retrieved OPTSA ID (if any) to OPTSA IDs previously added to the data file during an earlier import or export of project data, and when new PMSA data fields are added for a new data entity instance the OPTSA ID for that data entity instance will also be stored for later use in tracking. In some embodiments, a previously existing representation in the data file of the selected data entity instance may no longer be present, such as if a user of the PMSA deleted that data entity instance from the project after a previous import of project-related data into the OPTSA database. If so, the routine can handle the selected data entity instance in various ways in different embodiments (e.g., based on any defined conflict resolution rules), including adding a new representation in the data file for the selected data entity instance, declining to store any information for the selected data entity instance in the data file, generating an error or other status message for review and/or handling by a user, etc.

After step 1035, the routine continues to step 1040 to determine if there are more data entity instances from the database to be processed, and if so returns to step 1020. If not, the routine continues to step 1045 to determine if any instances of data entities that were updated or added in the PMSA data file during the current data export process need to be updated, such as to include references to other PMSA data file data entity instances and/or data fields (e.g., to represent relationships between data entity instances), and if so those data file data entity instances are updated as appropriate to include the references. The routine then continues to step 1050 to, in a manner similar to that previously described with respect to step 960 of FIG. 9, identify any PMSA data file data entity instances and/or data items that were present in the data file during the exportation process but did not have corresponding OPTSA database information. Any such data file data items are then deleted or otherwise processed (e.g., flagged as no longer being part of the project) as appropriate to indicate their current status based on the defined preferences. For example, in some embodiments all such data file data items may be deleted, while in other embodiments some or all such data file data items may be retained but marked as not currently being a part of the project (e.g., so as to not be used for future import and/or export), such as if those data entity instances have associated activity, time, expense or invoice information. The routine then continues to step 1095 to determine whether to continue. If so, the routine returns to step 1005, and if not the routine continues to step 1099 and ends. In some embodiments, the routine waits to receive additional requests to export project data, such as from another process (not shown) that may queue and/or otherwise manage such requests when they are received.

Figure 11:
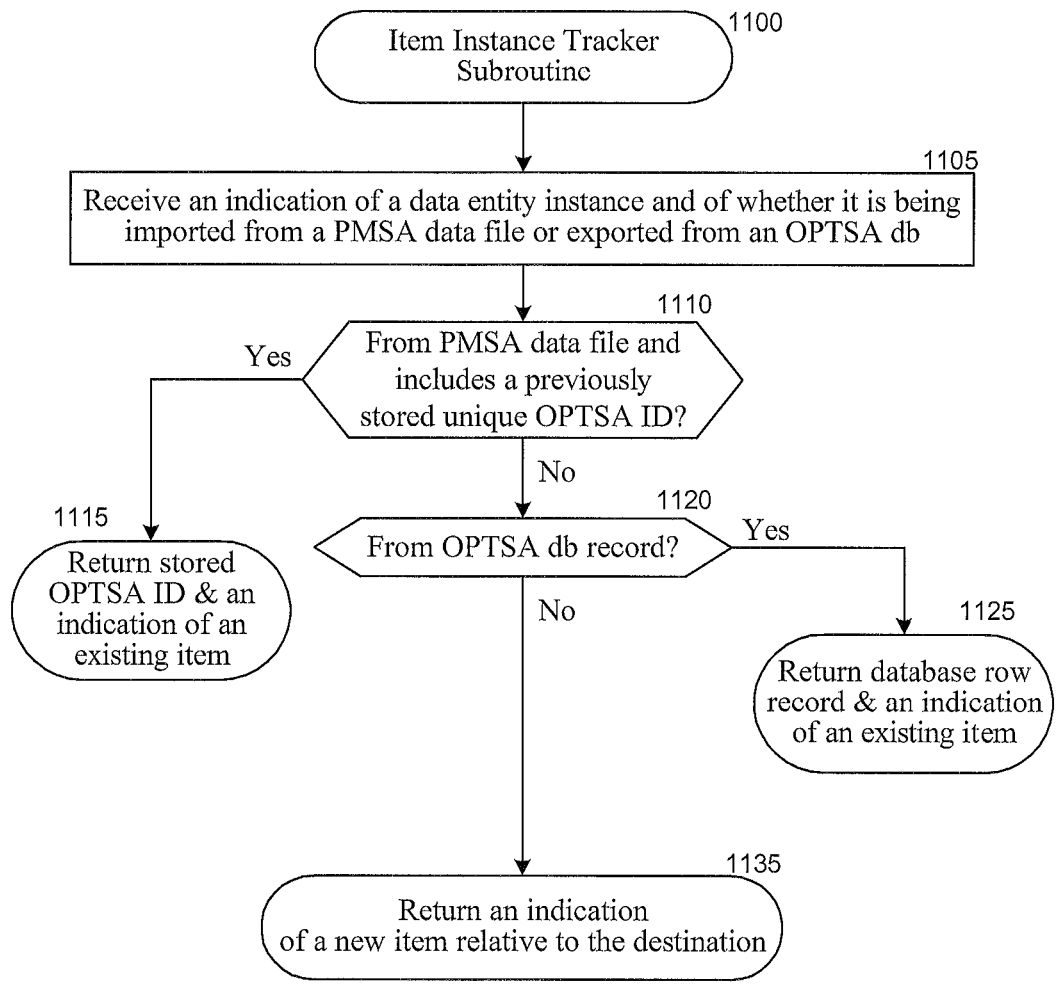
FIG. 11 is a flow diagram of an embodiment of the Item Instance Tracker subroutine.

FIG. 11 is a flow diagram of an embodiment of the Item Instance Tracker subroutine 1100. The subroutine receives an indication of a data entity instance being imported or exported and determines whether that data entity instance is being newly added to the destination or instead was previously present. For previously present data entity instances, the subroutine returns information to allow a corresponding currently existing data entity instance at the destination to be identified. In the illustrated embodiment, the OPTSA generates unique IDs for each data entity instance, and those IDs are used to track existing data entity instances, although in other embodiments data entity instances may be tracked in other manners.

The subroutine begins in step 1105, where an indication is received of a data entity instance and of whether it is being imported from a PMSA data file or exported from an OPTSA database. The subroutine continues to step 1110 to determine whether the data entity instance is being imported from a PMSA data file and if so whether the information stored for the data entity instance in the PMSA data file includes a previously stored unique OPTSA ID. If so, the subroutine continues to step 1115 to return with an indication of that stored OPTSA ID and that the data entity instance already exists. If it was instead determined in step 1110 that the data entity instance was not being imported from a PMSA data file or did not include a stored OPTSA ID, the subroutine continues to step 1120 to determine if the data entity instance is being exported from an OPTSA database, and if so the subroutine continues to step 1120 to return the OPTSA ID for the data entity instance along with an indication that the data entity instance already exists. If not, the subroutine continues to step 1135 and returns an indication that the data entity instance is new relative to the destination.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described for illustrative purposes, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method comprising:
receiving a local copy of a data file at a server computing system, wherein
the local copy of the data file is received from a client computing system,
the local copy of the data file includes data,
the local copy of the data file is in a first format,
the first format is used by a first software application, and
the local copy of the data file comprises values for multiple data fields in the local copy of the data file;
storing one or more local representations of the data in the local copy of the data file in a database at the server computing system, wherein
the data is stored in a second format, and
the second format is used by a second software application;
making a first modification to the one or more local representations of the data;
generating a new copy of the data file, wherein
the new copy of the data file reflects the first modification,
the new copy of the data file is stored in the second format; and
making a second modification to at least a portion of data in the new copy of the data file,
wherein the second modification is received from a second client computing system in the first format, and
the second modification is made by a copy of the first software application executing on the server computing system, wherein the second modification causes the local representations to be updated.

2. The method of claim 1, wherein the data is related to a project.

3. The method of claim 1, wherein
each of the one or more local representations comprises a value in a database data field that is mapped to a corresponding value in a data field of the local copy of the data file.

4. The method of claim 3, further comprising:
generating a mapping between the values in the local copy of the data field and the values in the database.

5. The method of claim 1, further comprising:
updating the local representations stored in the database, after the making the second modification to the at least a portion of the data in the new copy of the data file, wherein the updating is performed using the second software application executing on the server computing system.

6. The method of claim 5, further comprising:
updating the local copy of the data file, after the modifying the local representations, wherein
the updating the local copy of the data file is performed using the second software application executing on the server computing system.

7. The method of claim 1, wherein the first client computing system is a mobile client device.

8. The method of claim 1, further comprising:
creating the local copy of the data file at the client computing system, while the client computing system is disconnected from the server computing system, wherein
the creating is performed by the client computing system.

9. The method of claim 8, wherein
the receiving the local copy of the data file is performed after the client computing system has established a connection with the server computing system.

10. The method of claim 1, wherein the first and second software applications are not in direct communication with one another.

11. The method of claim 1, wherein
the generating the new copy of the data file is performed using a copy of the local representations of the data at the server computing system.

12. A non-transitory computer readable storage medium storing instructions, wherein
a method is implemented in response to executing the instructions, the method comprising:
receiving a local copy of a data file at a server computing system, wherein
the local copy of the data file is received from a client computing system,
the local copy of the data file includes data,
the local copy of the data file is in a first format,
the first format is used by a first software application, and
the local copy of the data file comprises values for multiple data fields in the local copy of the data file;
storing one or more local representations of the data in the local copy of the data file in a database at the server computing system, wherein
the data is stored in a second format, and
the second format is used by a second software application;
making a first modification to the one or more local representations of the data;
generating a new copy of the data file, wherein
the new copy of the data file reflects the first modification,
the new copy of the data file is stored in the second format; and
making a second modification to at least a portion of data in the new copy of the data file,
wherein the second modification is received from a second client computing system in the first format, and
the second modification is made by a copy of the first software application executing on the server computing system, wherein the second modification causes the local representations to be updated.

13. The non-transitory computer readable storage medium of claim 12, wherein
each of the one or more local representations comprises a value in a database data field that is mapped to a corresponding value in a data field of the local copy of the data file.

14. The non-transitory computer readable storage medium of claim 13, wherein the method further comprising:
generating a mapping between the values in the local copy of the data field and the values in the database.

15. The non-transitory computer readable storage medium of claim 12, wherein the method further comprising:
making a second modification to at least a portion of data in the new copy of the data file, wherein
the second modification is received from a second client computing system in the first format, and
the second modification is made by a copy of the first software application executing on the server computing system.

16. The non-transitory computer readable storage medium of claim 15, wherein the method further comprising:
updating the local representations stored in the database, after the making the second modification to the at least a portion of the data in the new copy of the data file, wherein
the updating is performed using the second software application executing on the server computing system.

17. The non-transitory computer readable storage medium of claim 16, wherein the method further comprising:
updating the local copy of the data file, after the modifying the local representations, wherein
the updating the local copy of the data file is performed using the second software application executing on the server computing system.

18. The non-transitory computer readable storage medium of claim 12, wherein the first client computing system is a mobile client device.

19. A server computing device comprising:
a memory in which a first software application and a second software application are executing to perform a method that comprises:
receiving a local copy of a data file, wherein
the local copy of the data file is received from a client computing system,
the local copy of the data file includes data,
the local copy of the data file is in a first format,
the first format is used by the first software application, and
the local copy of the data file comprises values for multiple data fields in the local copy of the data file,
storing one or more local representations of the data in the local copy of the data file in a database at the server computing system, wherein
the data is stored in a second format, and
the second format is used by the second software application,
making a first modification to the one or more local representations of the data,
generating a new copy of the data file, wherein
the new copy of the data file reflects the first modification,
the new copy of the data file is stored in the second format;
making a second modification to at least a portion of data in the new copy of the data file, wherein the second modification is received from a second client computing system in the first format, and the second modification is made by a copy of the first software application executing on the server computing system, wherein the second modification causes the local representations to be updated.

* * * * *